US011199278B2

(12) United States Patent
Brouwer et al.

(10) Patent No.: US 11,199,278 B2
(45) Date of Patent: Dec. 14, 2021

(54) CABLE MANAGEMENT ASSEMBLY

(71) Applicant: Panduit Corp., Tinley Park, IL (US)

(72) Inventors: Shaun P. Brouwer, St. John, IN (US); Surendra C. Babu, New Lenox, IL (US); Mateusz Kruzel, Orland Park, IL (US); Rodney G. Rouleau, Manhattan, IL (US)

(73) Assignee: Panduit Corp., Tinley Park, IL (US)

( * ) Notice: Subject to any disclaimer, the term of this patent is extended or adjusted under 35 U.S.C. 154(b) by 198 days.

(21) Appl. No.: 16/252,962

(22) Filed: Jan. 21, 2019

(65) Prior Publication Data

US 2019/0234532 A1    Aug. 1, 2019

Related U.S. Application Data

(60) Provisional application No. 62/622,213, filed on Jan. 26, 2018, provisional application No. 62/666,851, (Continued)

(51) Int. Cl.
*F16L 3/10* (2006.01)
*H02G 3/04* (2006.01)
(Continued)

(52) U.S. Cl.
CPC ............ *F16L 3/1075* (2013.01); *F16L 3/23* (2013.01); *H02G 3/0456* (2013.01); *H02G 3/32* (2013.01)

(58) Field of Classification Search
CPC ......... F16L 3/1075; F16L 3/23; H02G 3/0456
See application file for complete search history.

(56) References Cited

U.S. PATENT DOCUMENTS 2,923,510 A    10/1956  Walch
4,460,139 A     7/1984  Boehen et al.
(Continued)

FOREIGN PATENT DOCUMENTS

CN    102937213 A    2/2013
DE    19524294 A1    1/1997
(Continued)

OTHER PUBLICATIONS

Cooper Industrials Ltd "Cable Cleats Protect Your Investments"; 8 pages; Jan. 1, 2010; retrieved on Apr. 16, 2019.

*Primary Examiner* — David P Bryant
*Assistant Examiner* — Nirvana Deonauth
(74) *Attorney, Agent, or Firm* — Christopher S. Clancy; James H. Williams; Aimee E. McVady

(57) ABSTRACT

A cable management assembly includes a cleat assembly and a bracket assembly insertable through the cleat assembly to secure the cleat assembly to a ladder rung. The cleat assembly has an upper shell, a lower shell rotatably coupled to the upper shell, and a first fastener to secure the upper and lower shells. The bracket assembly has a C-shaped bracket having a first leg and a second leg extending parallel to the first leg. The first leg includes a longitudinal slot and the second leg includes a flange and a longitudinal slot extending through the second leg and the flange. A second fastener extends through the slot in the second leg and is movable between an open position in which the fastener is spaced apart from the first leg and a closed position in which the fastener is positioned within the slot in the first leg.

21 Claims, 37 Drawing Sheets

Related U.S. Application Data filed on May 4, 2018, provisional application No. 62/703,538, filed on Jul. 26, 2018.

(51) Int. Cl.
*H02G 3/32* (2006.01)
*F16L 3/23* (2006.01)

(56) References Cited

U.S. PATENT DOCUMENTS

| | | | |
|---|---|---|---|
| 4,502,743 A | 3/1985 | Ziegler | |
| 8,398,033 B2 | 3/2013 | Booth | |
| 8,882,057 B2 | 11/2014 | Dworak, Jr. | |
| 9,106,069 B2 * | 8/2015 | Frizzell | H02G 3/32 |
| 9,222,602 B2 | 12/2015 | Dworak, Jr. | |
| 9,404,605 B2 | 8/2016 | Booth et al. | |
| 9,551,438 B2 | 1/2017 | Frizzell | |
| 9,587,433 B2 | 3/2017 | Sylvester et al. | |
| 9,882,365 B2 | 1/2018 | Sylvester, Jr. | |

| | | | |
|---|---|---|---|
| 2015/0275578 A1 * | 10/2015 | Sylvester | F16L 3/1211 248/68.1 |

FOREIGN PATENT DOCUMENTS

| | | |
|---|---|---|
| DE | 102014018248 A1 | 6/2016 |
| EP | 0661466 A1 | 7/1995 |
| EP | 0872677 A2 | 10/1998 |
| EP | 0961069 A1 | 12/1999 |
| EP | 2571124 A1 | 3/2013 |
| ES | 2342649 A1 | 7/2010 |
| GB | 771376 | 4/1957 |
| GB | 2324568 A | 10/1998 |
| GB | 2339237 B | 6/2001 |
| GB | 2361029 B | 10/2001 |
| GB | 2389970 B | 12/2003 |
| GB | 2405900 B | 3/2005 |
| GB | 2409938 B | 7/2005 |
| WO | 9703273 A1 | 1/1997 |
| WO | 9849484 A1 | 11/1998 |

* cited by examiner

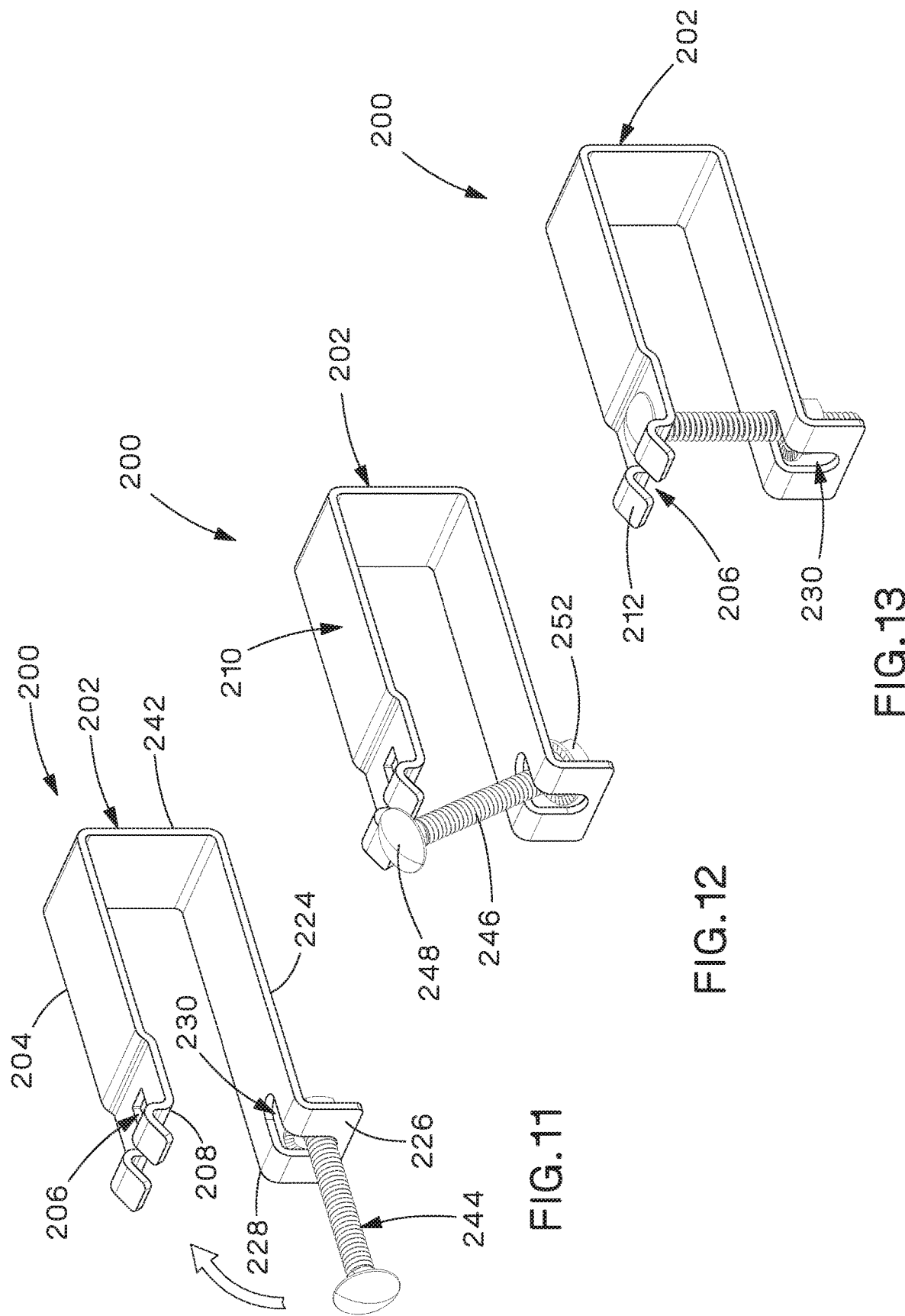

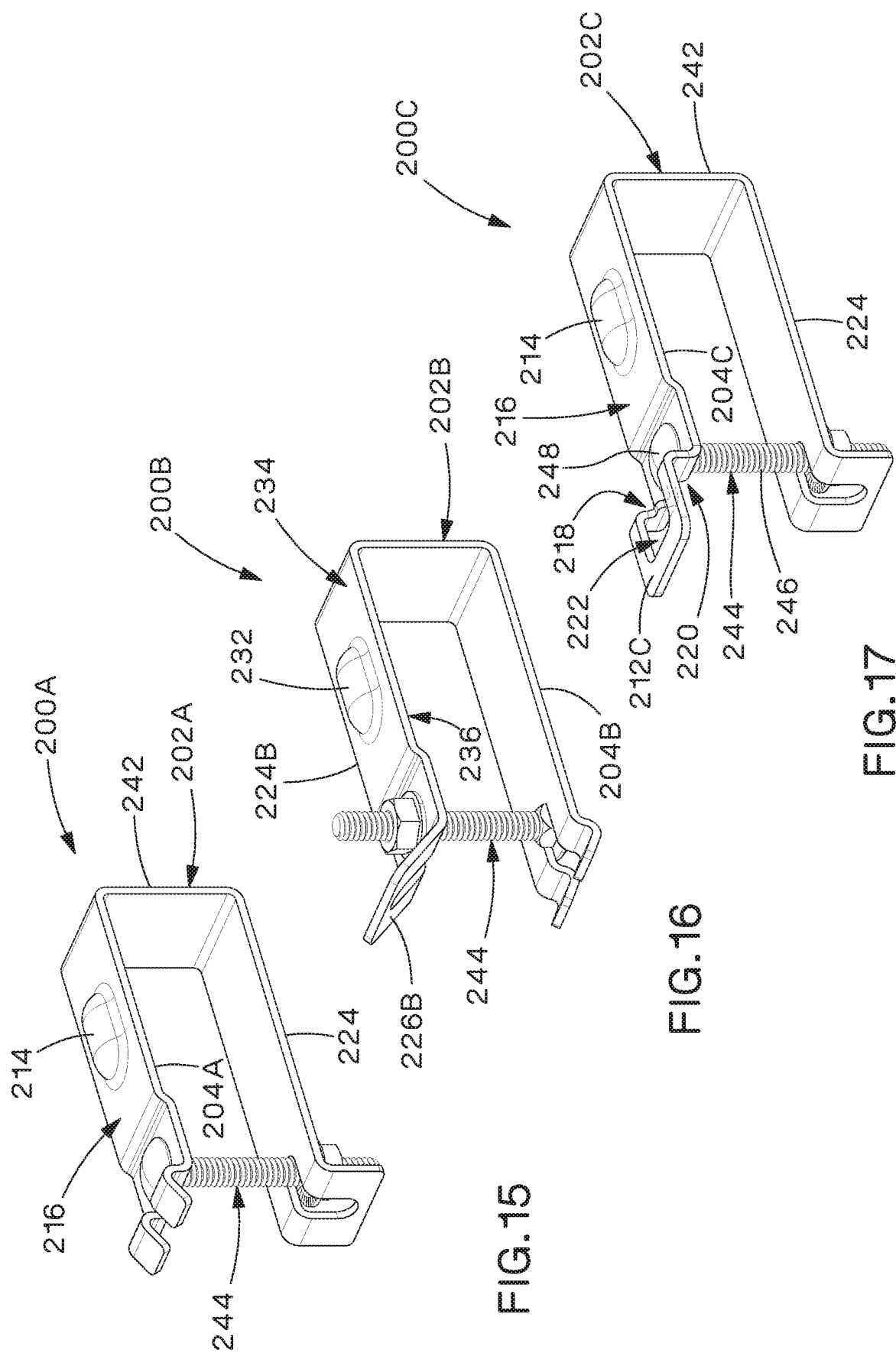

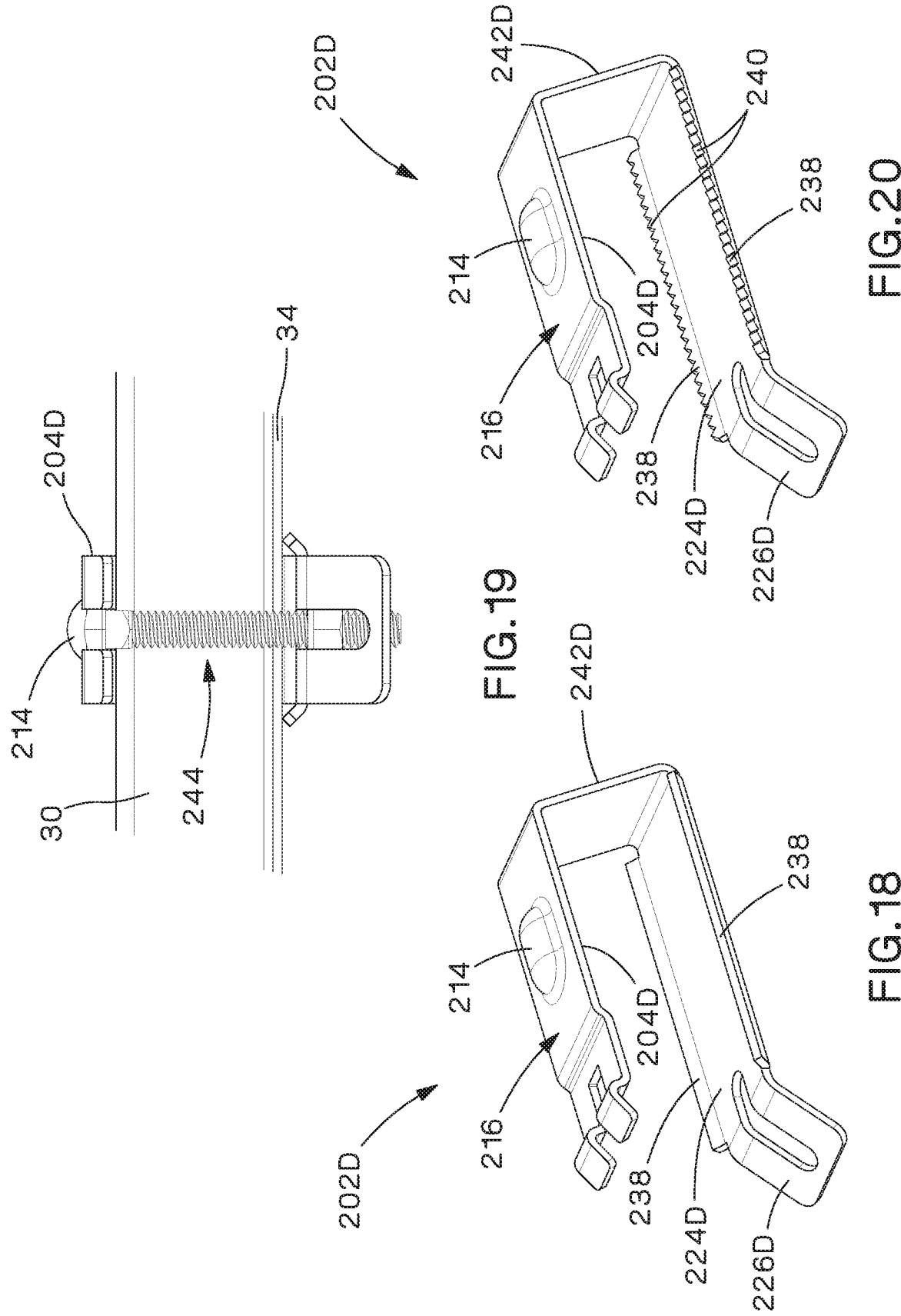

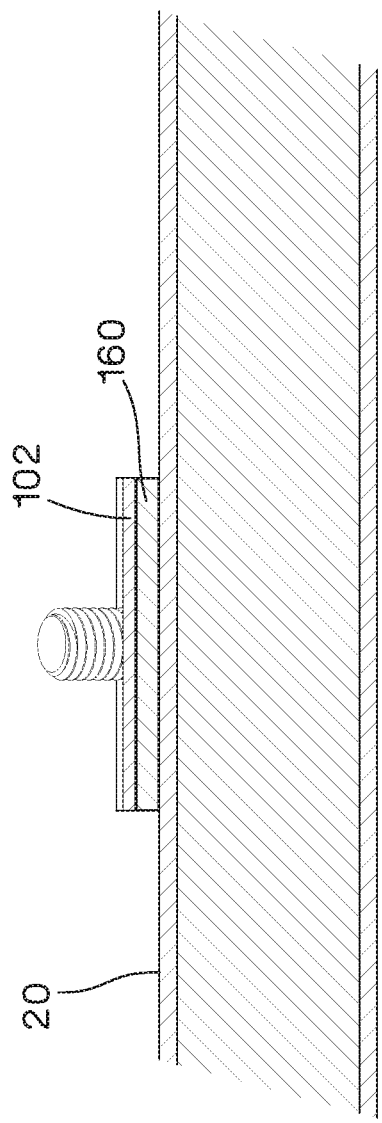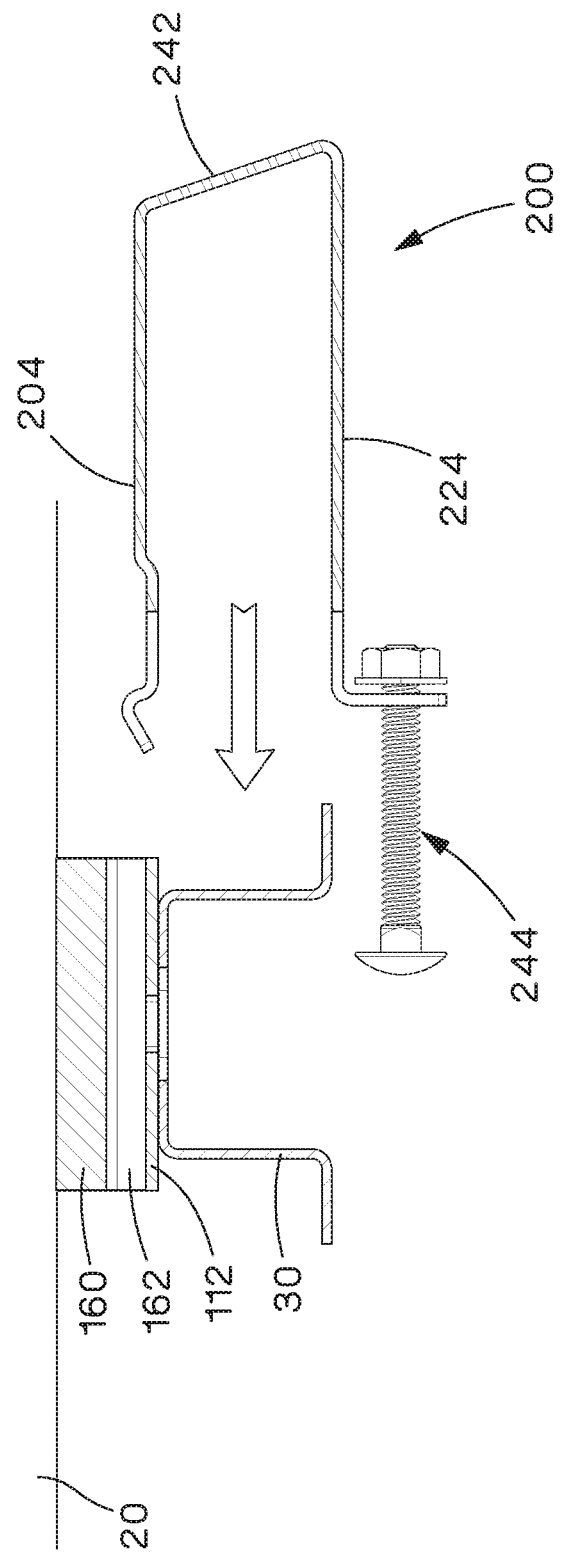
FIG. 39

CABLE MANAGEMENT ASSEMBLY

CROSS REFERENCE TO RELATED APPLICATION

This application claims priority to U.S. Provisional Application No. 62/622,213, filed Jan. 26, 2018; U.S. Provisional Application No. 62/666,851, filed May 4, 2018; and U.S. Provisional Application No. 62/703,538, filed Jul. 26, 2018, the subject matter of which is hereby incorporated by reference in its entirety.

FIELD OF THE INVENTION

The present invention generally relates to cable management assemblies, and, more specifically, to cable management assemblies having cleats and brackets.

BACKGROUND

Cable cleats or cleat assemblies are typically used to manage and secure 3-phase power cables of various sizes in a trefoil arrangement along a cable ladder or ladder rung. In addition to securing cables laterally and axially, cable cleats must be rigid enough to retain cables during short-circuit events, where electromagnetic forces can cause the cables to repel one another at extremely high forces. Cable cleats hold the cables in place during a short-circuit event to prevent damage to people and property.

Typically, cable cleats are secured to a ladder rung using a bolt and nut inserted through the cable cleat and the ladder rung. However, there are many different types and sizes of ladder rungs and not all ladder rungs have slots for attachment. Therefore, other attachment means are often required. In addition, during installation, these cable cleats must be installed onto the ladder rung before cable can be placed in the cable ladder or moved into a position out of the way of the cable cleats since access to the mounting bolt is required for installation, which is directly over the position of the cables. Some cable management assemblies include a C-shaped bracket, but these brackets include loose hardware and do not center the cable cleat over the ladder rung.

Therefore, there is a need for a cable management assembly that can be used to manage and secure 3-phase power cables, preferably in a trefoil arrangement, that can be installed on a ladder rung with the cables in the cable cleat, and that do not include loose hardware that can be lost or misplaced.

SUMMARY

In one example, a cable management assembly comprises a cleat assembly and a bracket assembly insertable through the cleat assembly to secure the cleat assembly to a ladder rung. The cleat assembly comprises an upper shell, a lower shell rotatably coupled to the upper shell, and a first fastener insertable through holes in the upper and lower shells to secure the upper and lower shells when rotated into a closed position. The bracket assembly comprises a generally C-shaped bracket having a first leg, a second leg extending generally parallel to the first leg, and a third leg interconnecting the first and second legs. The first leg includes a longitudinal slot extending from a distal end of the first leg and the second leg includes a flange extending at an angle from a distal end of the second leg and a longitudinal slot extending through a portion of the second leg and a portion of the flange. A second fastener is securable between the first and second legs of the bracket, extends through the slot in the second leg, is movably secured to the second leg, and is movable between an open position in which the fastener is spaced apart from the first leg and a closed position in which the fastener is positioned within the slot in the first leg.

In another example, a method for installing a cable management assembly comprises the steps of: positioning a cleat assembly on a ladder rung; positioning a cable within the cleat assembly; securing the cleat assembly in a closed position; inserting a bracket assembly through the cleat assembly and around the ladder rung; and securing the bracket assembly to the ladder rung.

In another example, a quick-install cable management bracket assembly comprises a generally C-shaped bracket having a first leg, a second leg extending generally parallel to the first leg, and a third leg interconnecting the first and second legs. A longitudinal slot extends from a distal end of the first leg. A flange extends at an angle from a distal end of the second leg and a longitudinal slot extends through a portion of the second leg and a portion of the flange. A fastener extends through the slot in the second leg, is movably secured to the second leg, and is movable between an open position in which the fastener is spaced apart from the first leg and a closed position in which the fastener is positioned within the slot in the first leg.

In another example, a cable management cleat assembly comprises an upper shell, a lower shell rotatably coupled to the upper shell, and a fastener insertable through holes in the upper and lower shells to secure the upper and lower shells when rotated into a closed position. A base spacer is secured to the lower shell and has a transverse slot to receive a bracket assembly therethrough.

BRIEF DESCRIPTION OF THE DRAWINGS

Certain examples of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular examples illustrated herein.

FIG. 11 is a perspective view of an example bracket assembly of the cable management assembly of FIG. 1 in an open position;

FIG. 12 is a perspective view of the bracket assembly of FIG. 11 in an intermediate position;

FIG. 13 is a perspective view of the bracket assembly of FIG. 11 in a closed position;

FIG. 15 is a perspective view of another example bracket assembly;

FIG. 16 is a perspective view of another example bracket assembly;

FIG. 17 is a perspective view of another example bracket assembly;

FIG. 18 is a perspective view of an example bracket of another example bracket assembly;

FIG. 19 is a side view of the bracket assembly of FIG. 18 secured to a ladder rung;

FIG. 20 is a perspective view of another example bracket of another example bracket assembly;

FIG. 39 is a cross-sectional view of the cleat assembly of FIG. 38 taken along the line 39-39 in FIG. 38 with an example bracket assembly in the open position;

DETAILED DESCRIPTION

The examples shown and described herein provide cable management assemblies, cable cleat assemblies, and bracket assemblies that include a hinged cable cleat with a quick-install bracket assembly for attachment to a ladder rung. While the examples shown herein depict cable management assemblies for use with cables in a trefoil cable arrangement, the example cable management assemblies can also be modified for use with a single cable arrangement or any number of cables.

When installing the example cable management assemblies shown and described herein, the cables can be laid on a ladder rung with the cleat assembly and bracket assemblies being positioned and secured after the cables have been positioned on the ladder rung. This provides an easier installation process to keep the cables in a trefoil formation and reduces the possibility of damage to the cables and cleat assemblies if the cables are pulled after the cleat assemblies are installed. In addition, in the example cable management assemblies the cleat assemblies and bracket assemblies can be installed independent of each other (e.g., the cleat assembly can be attached to the cables and positioned on the ladder rung followed by installation of the bracket assembly or the bracket assembly can be installed on the ladder rung followed by sliding the cleat assembly onto the bracket assembly), which further simplifies the installation process. Finally, the example bracket assemblies can be centered over the ladder rung and don't have any loose parts and can be delivered as one package, ready to install, thereby reducing the possibility of lost or misplaced parts.

Figure 1:
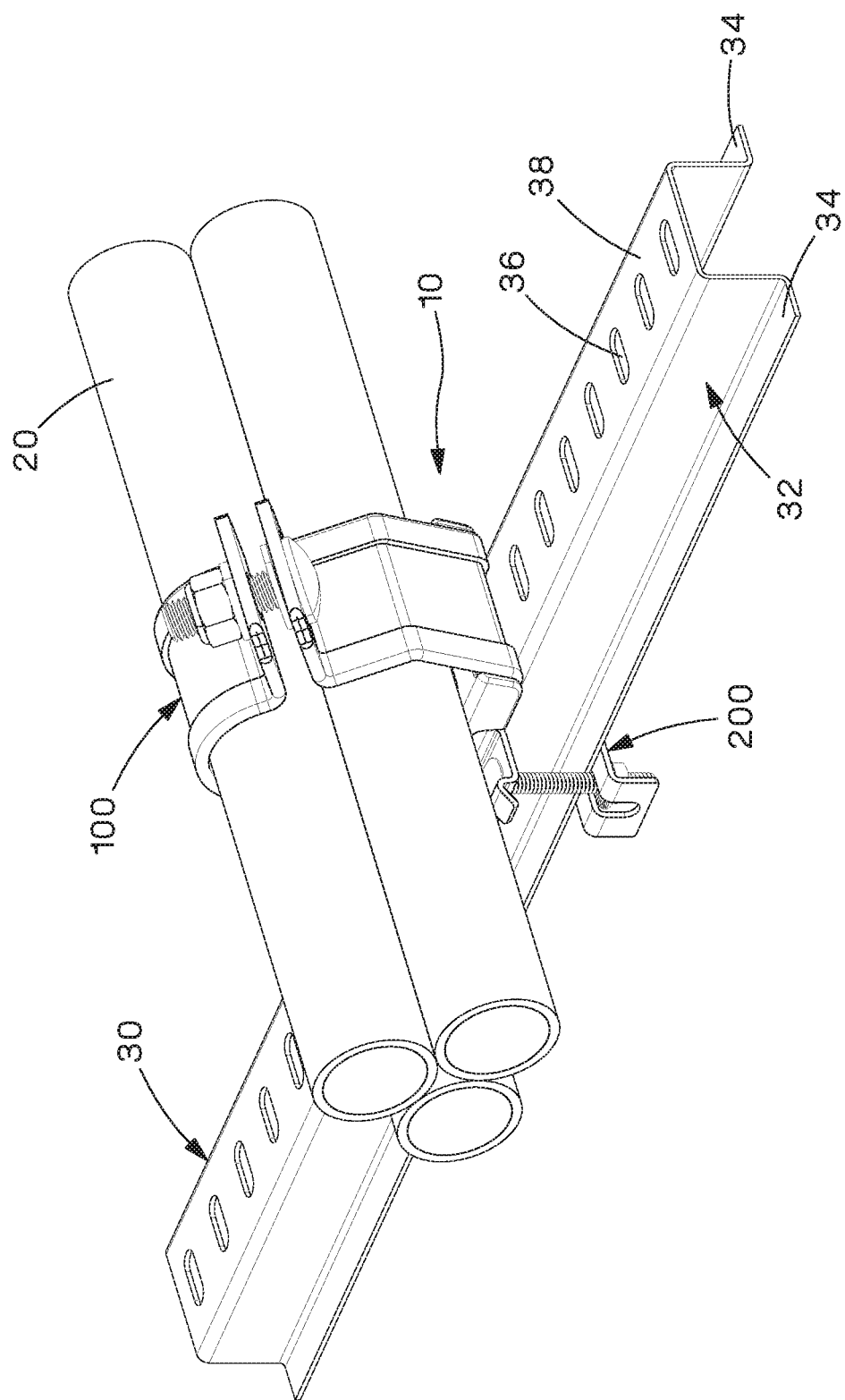
FIG. 1 is a perspective view of an example cable management assembly secured to a ladder rung.
Figure 2:
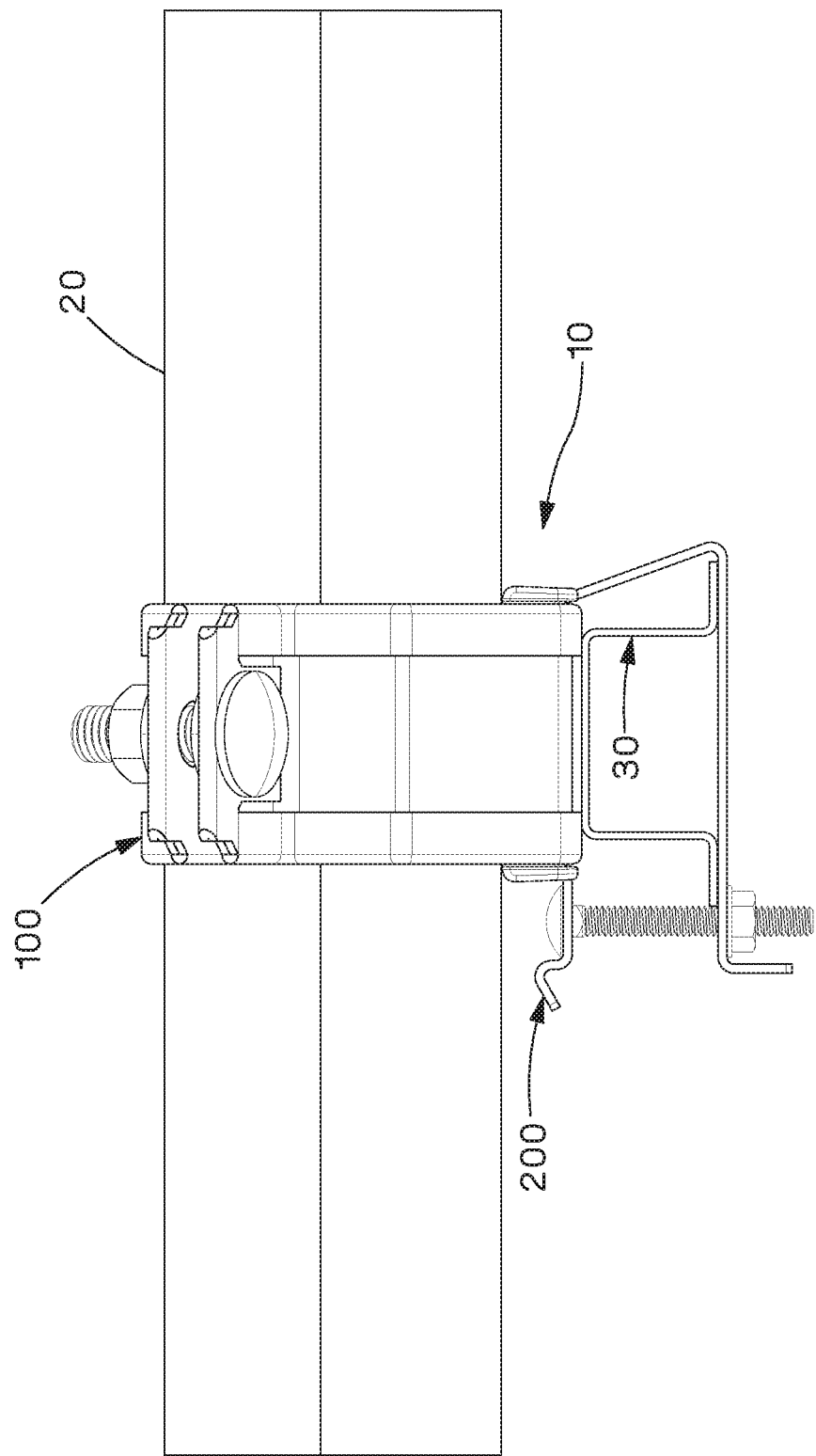
FIG. 2 is a front view of the cable management assembly and ladder rung of FIG. 1.
Figure 3:
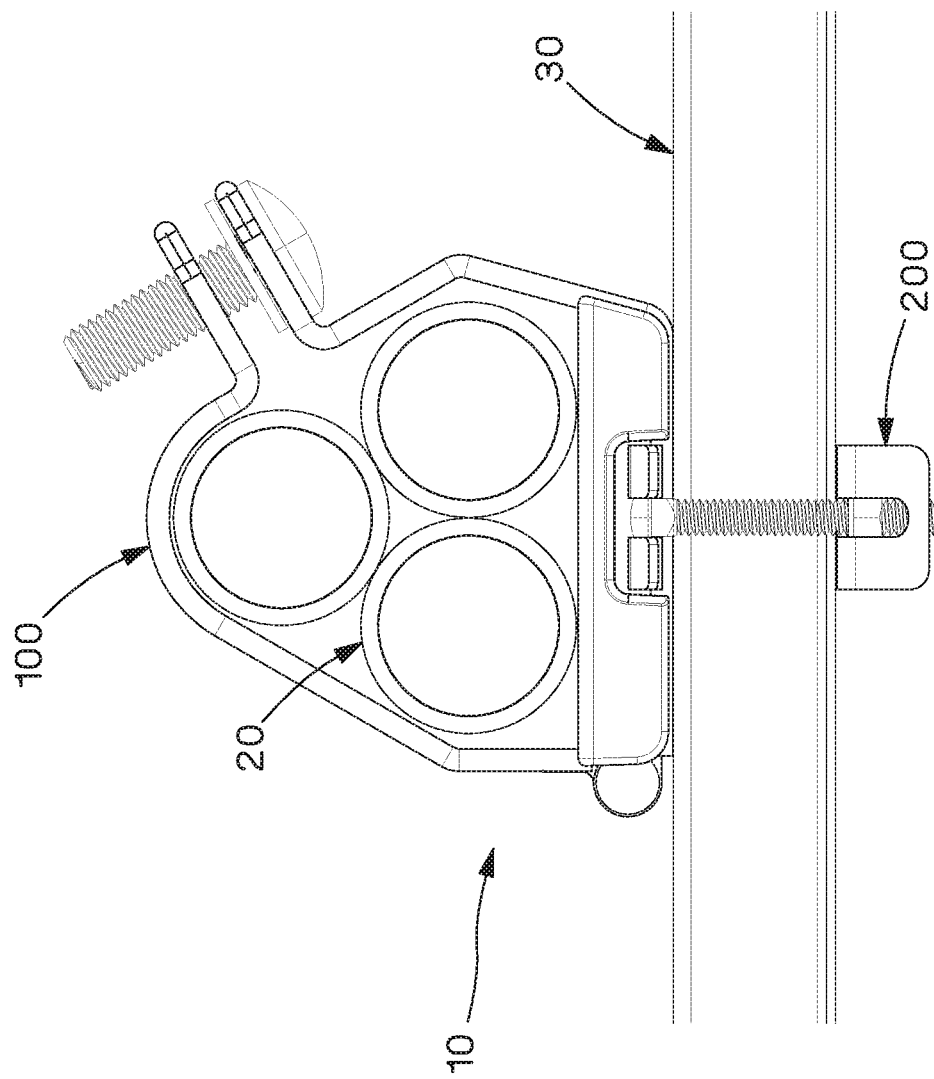
FIG. 3 is a side view of the cable management assembly and ladder rung of FIG. 1.

Referring to FIGS. 1-3, an example cable management assembly 10 secures cables 20 along ladder rung 30 and includes a cleat assembly 100 to manage and secure cables 20 and a bracket assembly 200 to secure cleat assembly 100 to ladder rung 30. In the particular example shown, cables 20 are in a trefoil arrangement. However, cable management assembly 10 could be used or adapted for use with a single cable or any number of cables in other arrangements as well. In addition, ladder rung 30 is shown having a generally U-shaped body 32 with flanges 34 extending from ends of body 32 and holes 36 formed through a top wall 38 of body 32. However, cable management assembly 10 could be used or adapted for use with ladder rungs having various shapes and can be used with ladder rungs with or without holes.

Figure 4:
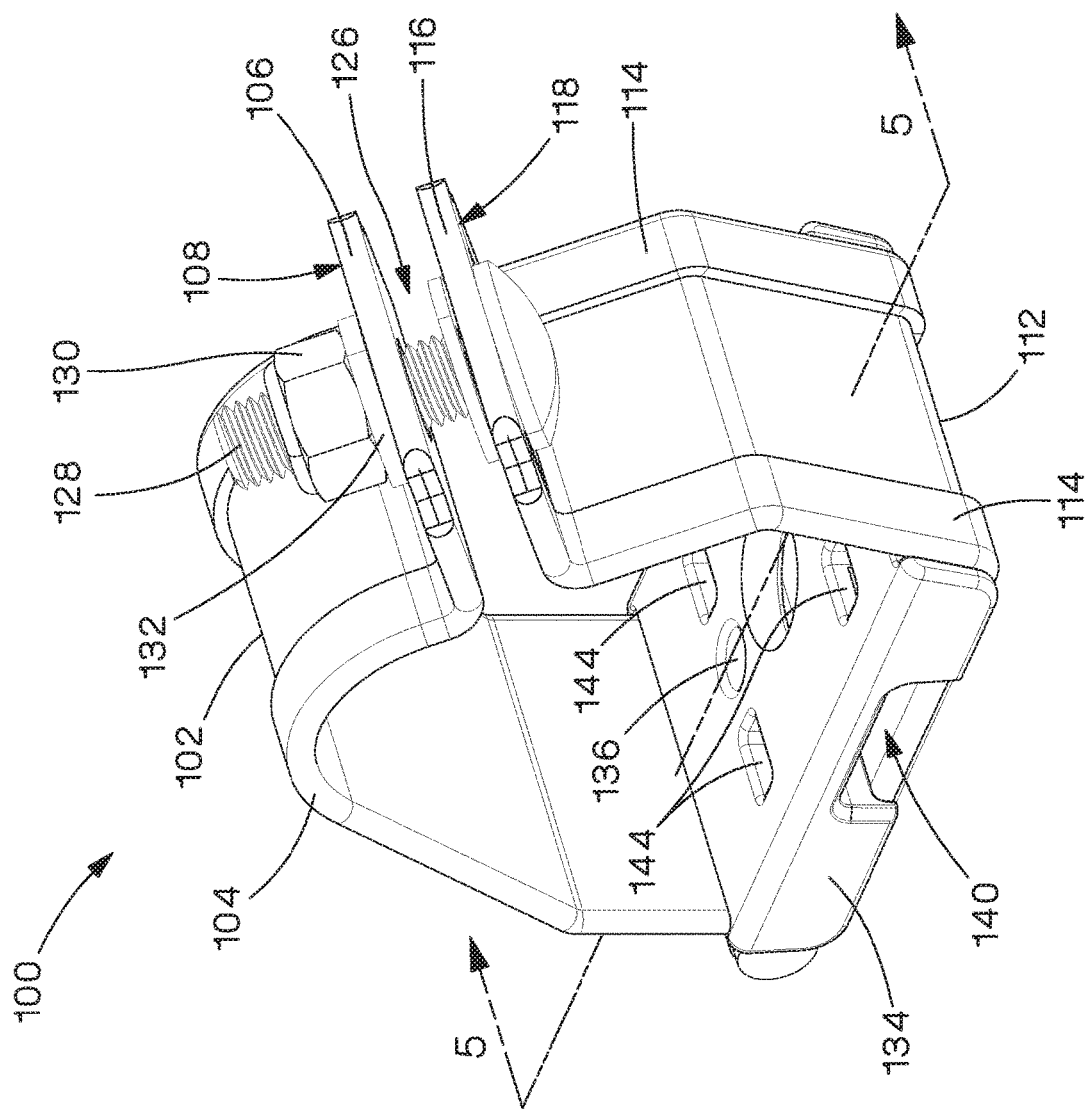
FIG. 4 is a perspective view of an example cleat assembly of the cable management assembly of FIG. 1.
Figure 5:
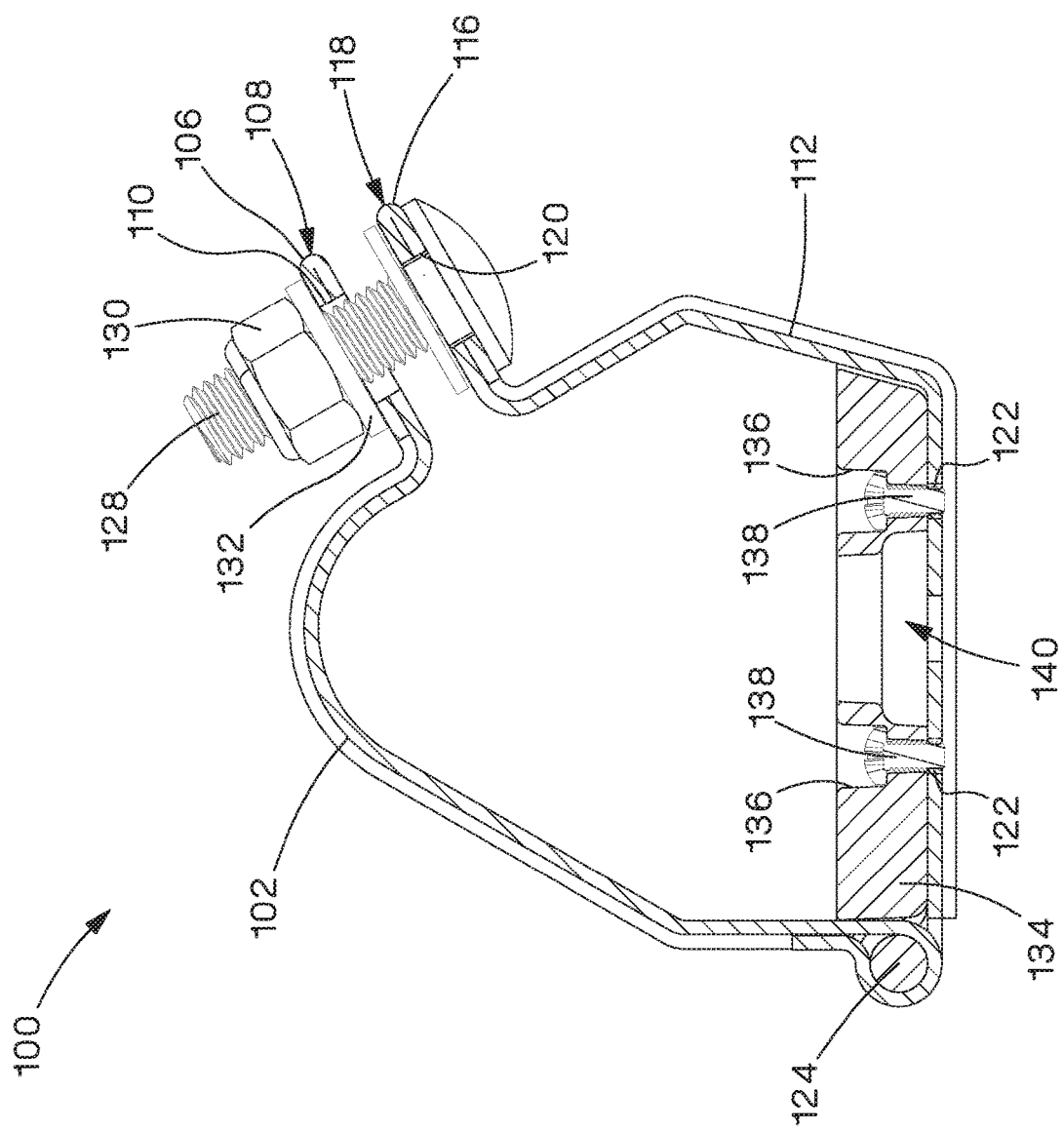
FIG. 5 is a cross-sectional view of the cleat assembly of FIG. 4 taken along line 5-5 in FIG. 4.
Figure 6:
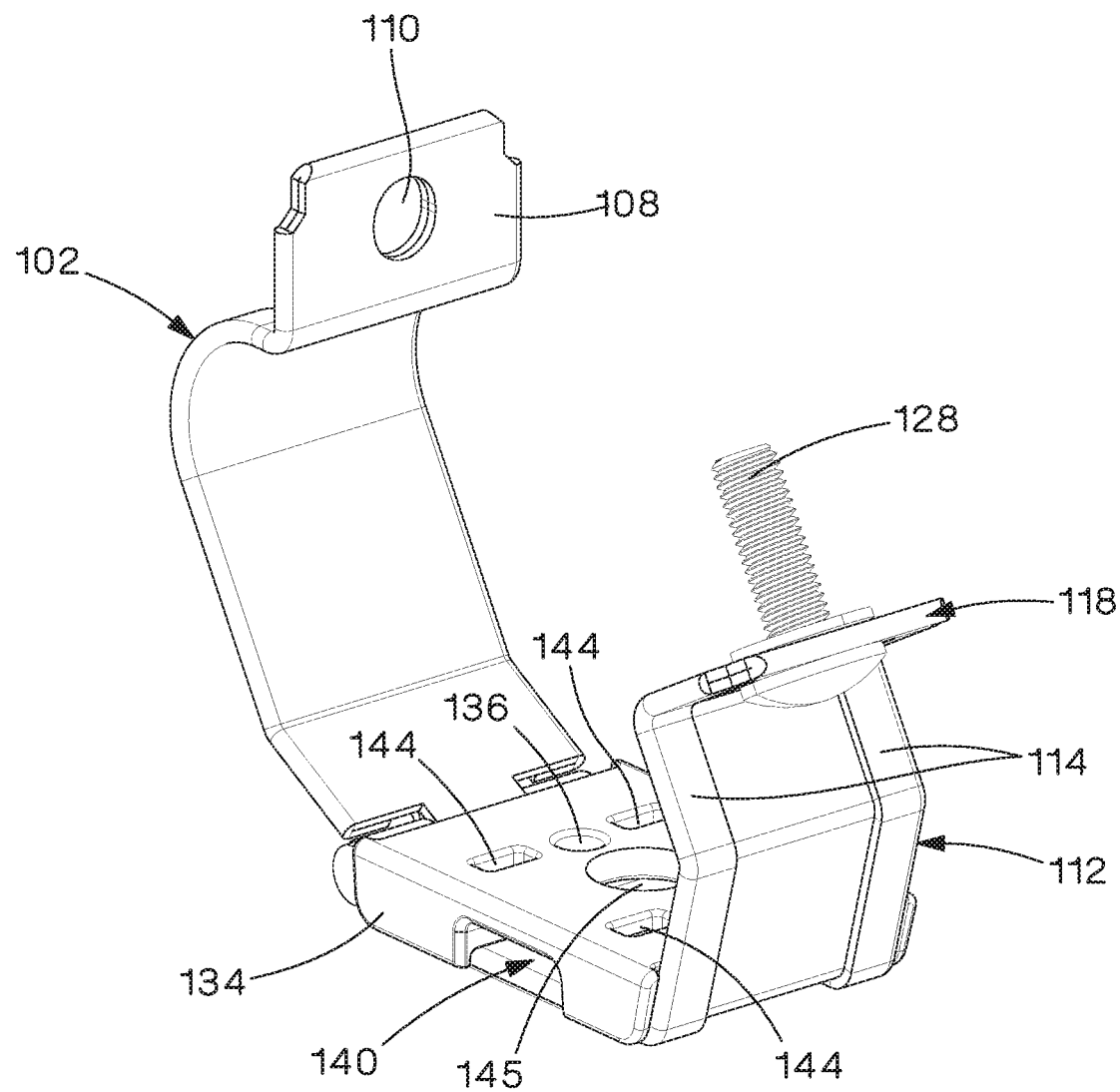
FIG. 6 is a perspective view of the cleat assembly of FIG. 4 in an open position.
Figure 7:
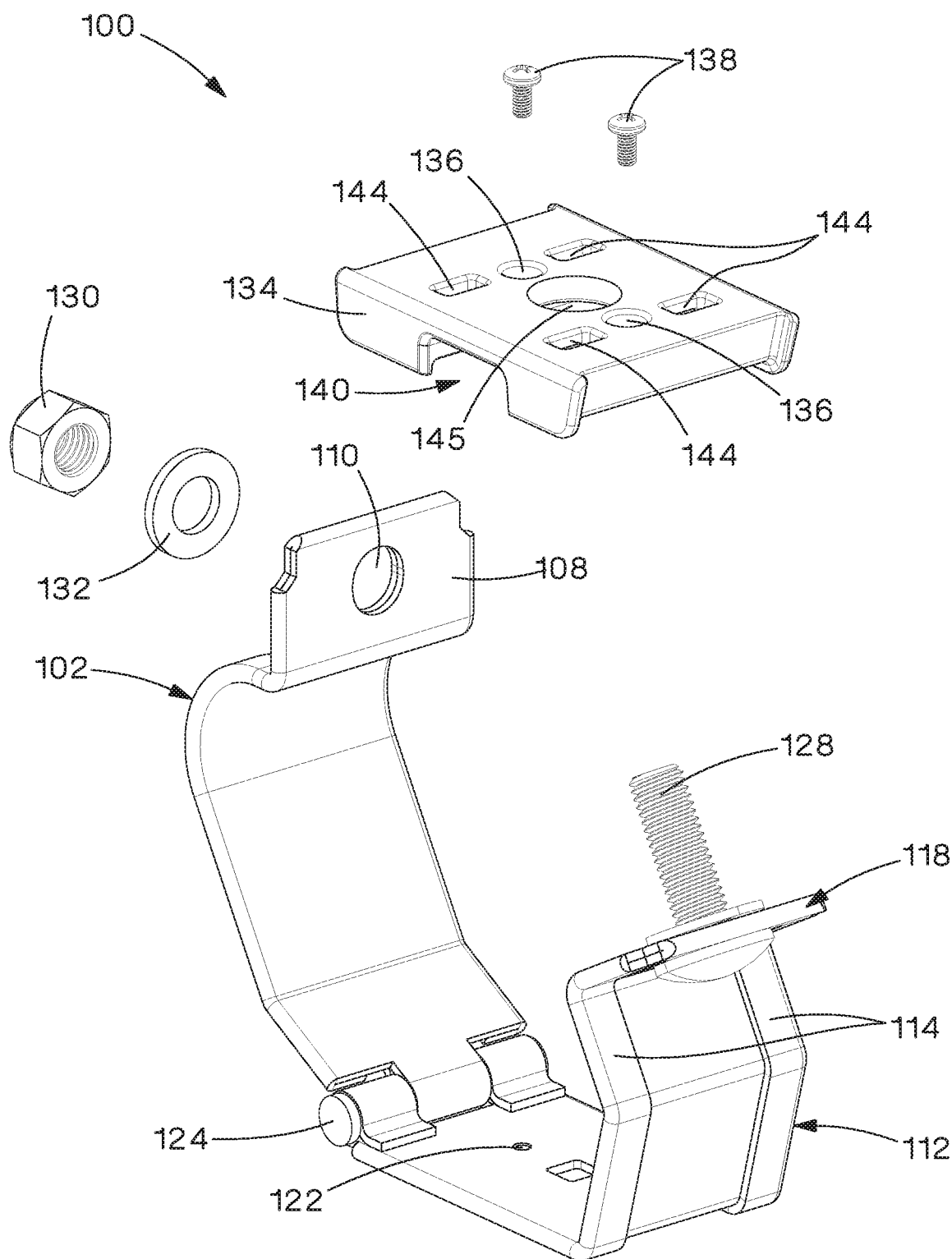
FIG. 7 is an exploded perspective view of the cleat assembly of FIG. 4 in an open position.

Referring to FIGS. 4-9, one example of a cleat assembly 100 has an upper shell 102 and a lower shell 112. Upper and lower shells 102, 112 can be made from formed sheet metal, or any other desired material that has the required strength, and, can be shaped to receive cables 20 in a trefoil formation or shaped to accommodate any other cable formation desired. In addition, upper and lower shells 102, 112 can have hemmed or folded edges 104, 114 and/or hemmed or folded ends 106, 116 around the perimeter to strengthen upper and lower shells 102, 112 and provide rounded edges to prevent damage to the jacketing of cables 20. Lower shell 112 is rotatably coupled to upper shell 102 through a hinge pin 124 that extends through a portion of upper and lower shells 102, 112, such that upper and lower shells 102, 112 are rotatable between an open position (FIGS. 6 and 7) and a closed position (FIG. 4).

A fastener 126 is inserted through holes 110, 120 formed through flanges 108, 118 of upper and lower shells 102, 112 to secure upper and lower shells 102, 112 in the closed position. In the example shown, fastener 126 includes bolt 128 and nut 130 and can also include a washer 132. To secure upper and lower shells 102, 112 in the closed position, bolt 128 is inserted through holes 110, 120 and nut 130 is threaded onto bolt 128.

A base spacer 134 is secured to lower shell 112 by one or more threaded members 138 that extend through holes 136 in base spacer 134 and are threaded into threaded holes 122 in lower shell 112. Base spacer 134 can be used to protect cables 20 and to take up any tolerances in the size of cable 20 and has a transverse slot 140 formed in a bottom surface to receive bracket assembly 200 to secure cable management assembly 10 to ladder rung 30, as described in more detail below. In certain installations where cleat assembly 100 is used to secure cables 20, but is not mounted to a ladder rung, a spacer plug 142 (FIG. 26) can be inserted into slot 140 of base spacer 134 to provide support and additional strength to base spacer 134.

Figure 8:
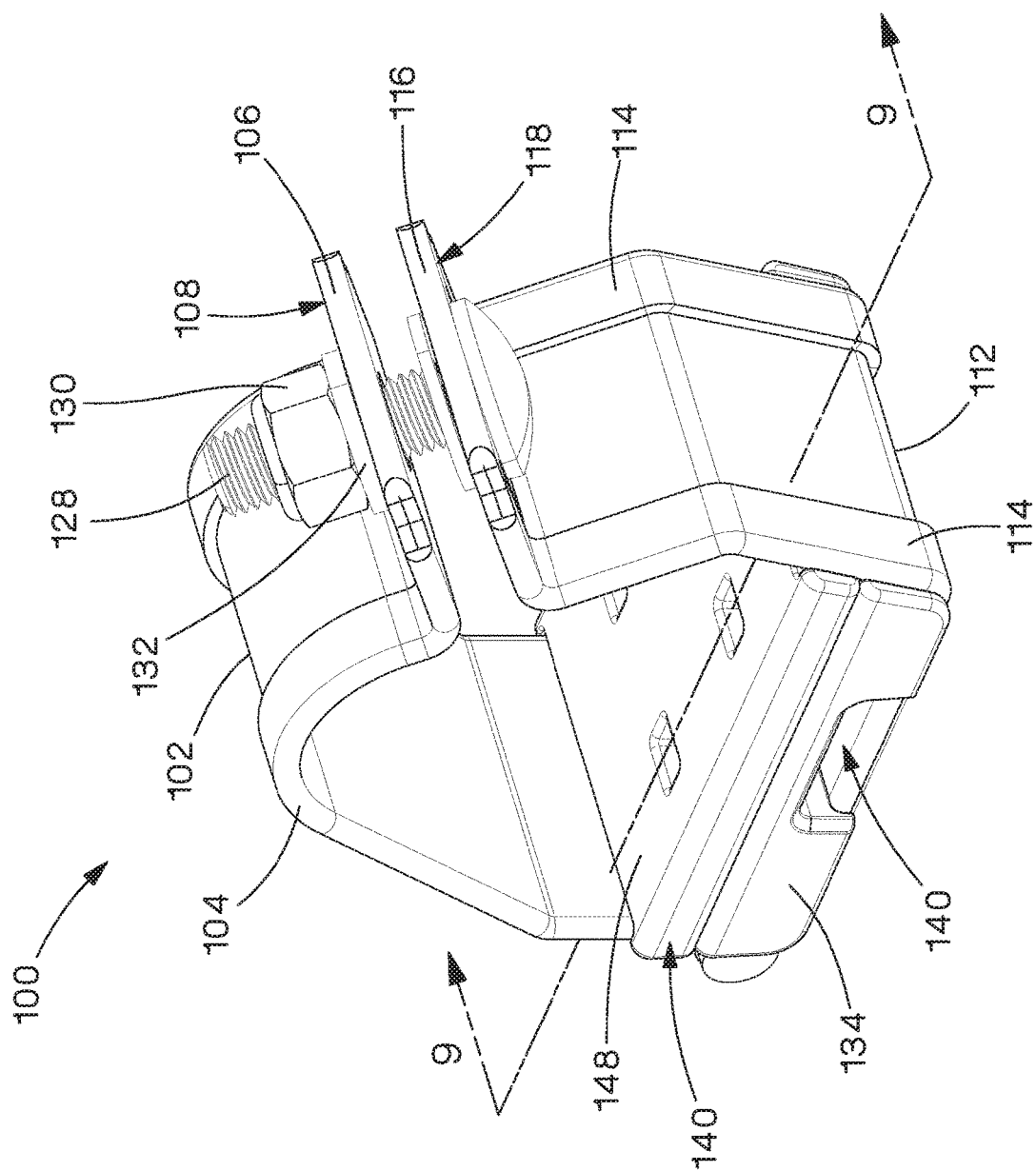
FIG. 8 is a perspective view of the cleat assembly of FIG. 4 with a secondary spacer.
Figure 9:
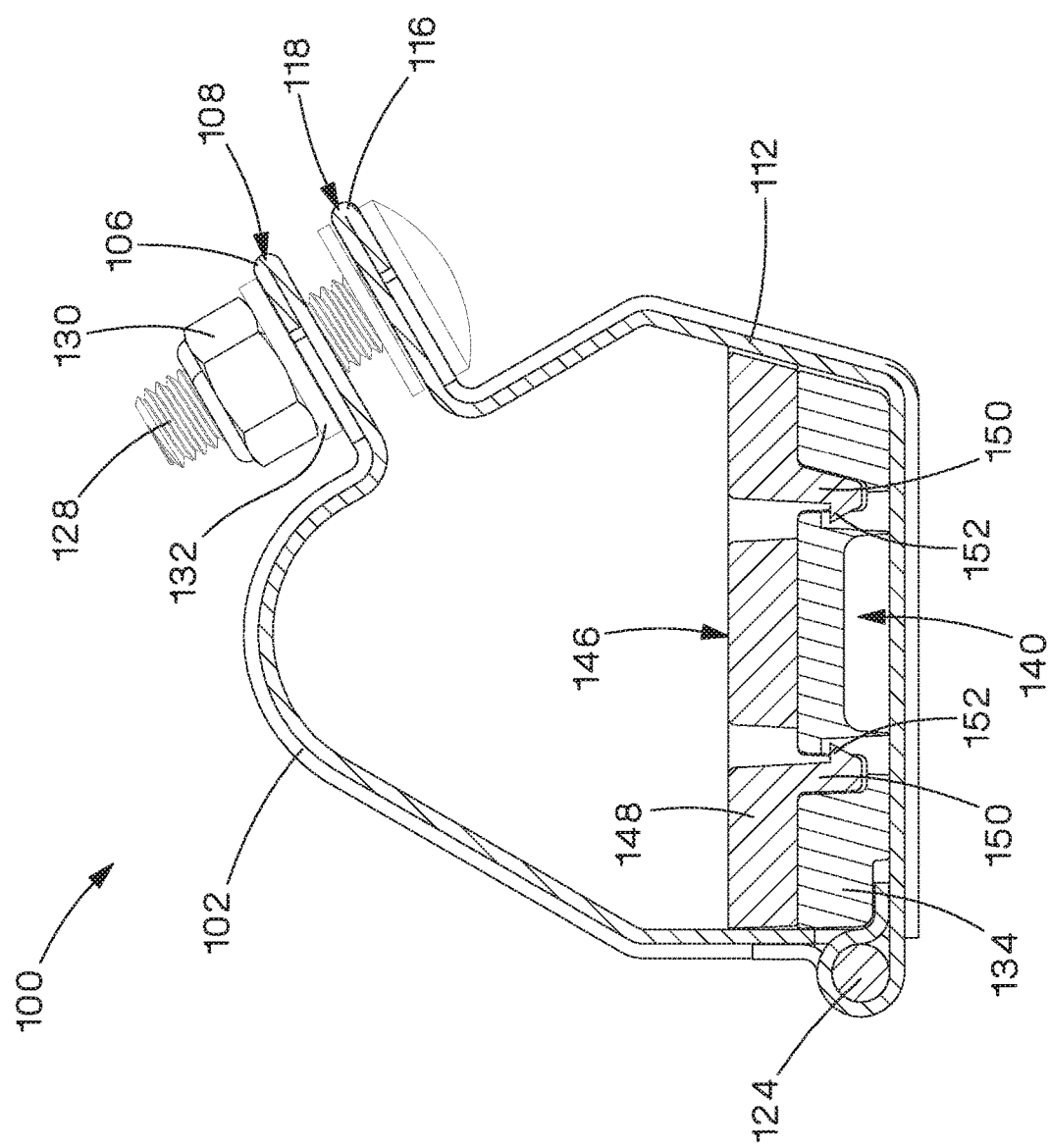
FIG. 9 is cross-sectional view of the cleat assembly of FIG. 8 taken along the line 9-9 if FIG. 8.

As shown in FIGS. 8-9, cleat assembly 100 can also have an additional secondary spacer 146 removably secured to base spacer 134 to allow cleat assembly 100 to be used with a larger range of cable sizes. In the example shown, secondary spacer 146 includes legs 150 that extend from a body 148 of secondary spacer 146 and tabs 152 at the end of each leg 150. Legs 150 extend through apertures 144 in base spacer 134 to secure secondary spacer 146 to base spacer 134 through a snap fit connection to prevent secondary spacer 146 from ejecting from cleat assembly 100 during a short-circuit event.

Figure 10:
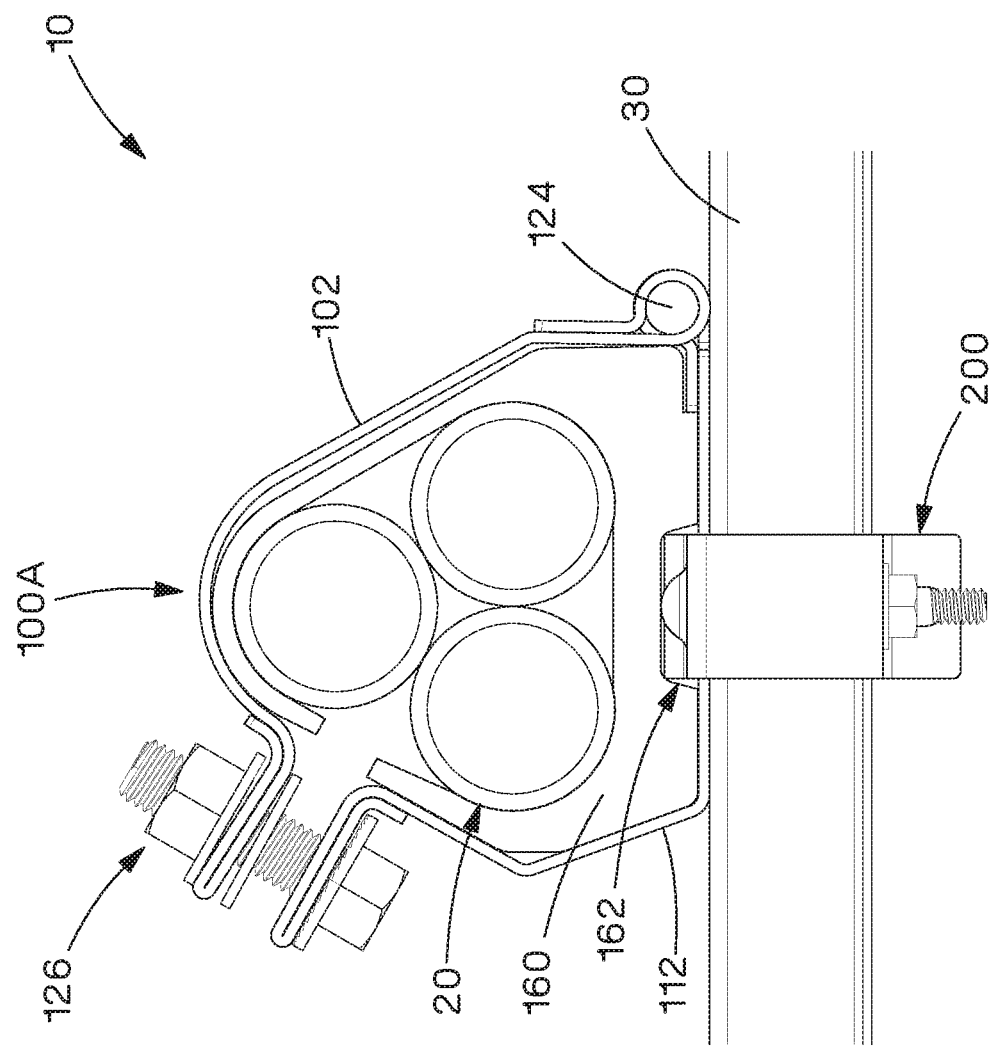
FIG. 10 is a side view of another example cable management assembly secured to a ladder rung.

Another example cleat assembly 100A is shown in FIG. 10. Cleat assembly 100A is generally the same as cleat assembly 100 and identical elements between cleat assembly 100A and cleat assembly 100 use the same reference numbers. The main difference between cleat assembly 100A and cleat assembly 100 is that rather than having base spacer 134, cleat assembly 100A includes a flexible cable protection insert 160 that is positioned within upper and lower shells 102, 112 and encircles cables 20 such that there is no contact between cables 20 and upper shell 102 or lower shell 112. Similar to base spacer 134, flexible cable protection insert 160 also has a transverse slot 162 formed in a bottom surface to receive bracket assembly 200 to secure cleat assembly 100A to ladder rung 30, as described in more detail below.

Figure 14:
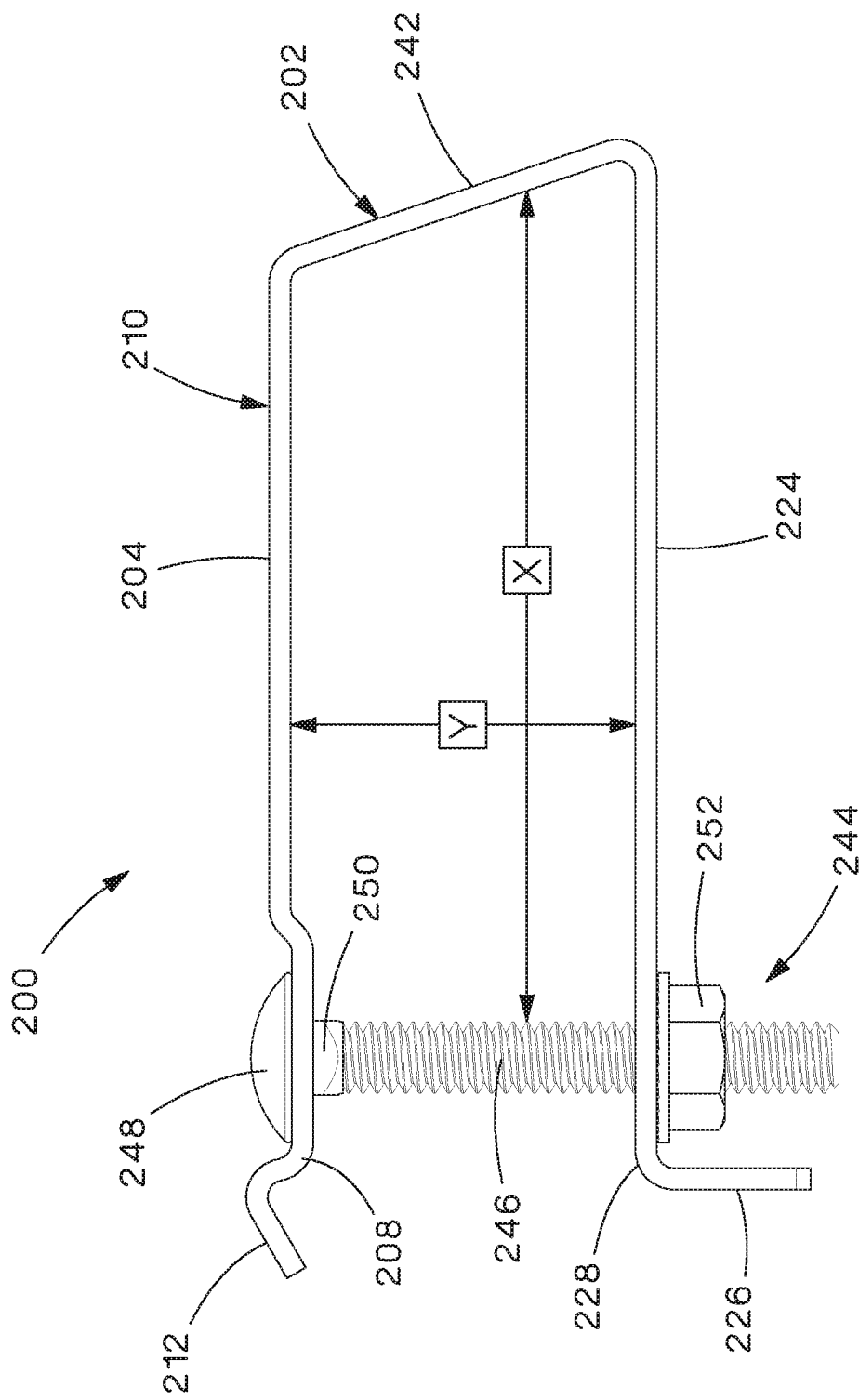
FIG. 14 is a front view of the bracket assembly of FIG. 13.

Referring to FIGS. 11-14, one example of a bracket assembly 200 is shown in an open position (FIG. 11), an intermediate position (FIG. 12), and a closed position (FIGS. 13-14). Bracket assembly 200 includes a generally C-shaped bracket 202 and a fastener 244. Bracket assembly 200 is insertable through cleat assembly 100 to secure cleat assembly 100 to ladder rung 30, as described in more detail below. Bracket 202 has first and second legs 204, 224 that extend generally parallel to each other and a third leg 242 that interconnects first and second legs 204, 224. Third leg 242 can be oriented generally perpendicular to first and second legs 204, 224 or can be oriented at an acute angle to one of first or second legs 204, 224 to provide space for flanges 34 of ladder rung 30. In this configuration, a family of brackets could be created with different heights x and lengths y (FIG. 14) to accommodate a vast array of sizes and or geometries of ladder rung. Additional features such as hemmed or folded edges and/or hemmed or folded ends of first, second, and third legs 204, 224, 242 can also be provided to add strength to bracket 202. Fastener 244 is securable between first and second legs 204, 224 and, in the example shown, includes bolt 246 and nut 252, but any other method of securing can also be used.

First leg 204 includes a longitudinal slot 206 that extends into first leg 204 from a distal end 208. Slot 206 is dimensioned to engage a square key 250 beneath head 248 of bolt 246 to prevent bolt 246 from rotating when bracket assembly 200 is in the closed position, making the installation process easier, and head 248 of bolt 246 has a diameter that is larger than the width of slot 206. A flange 212 can also extend from distal end 208 of first leg 204 to prevent fastener 244 from dislodging from first leg 204 after installation and slot 206 would also extend longitudinally through flange 212. First leg 204 can also have an inset portion 210 configured to receive lower shell 112 of cleat assembly 100.

Second leg 224 includes a flange 226 that extends at an angle from a distal end 228 of second leg 224. In the example shown in FIGS. 11-14, flange 226 extends generally perpendicular to second leg 224. However, flange 226 can also extend at an acute angle to a longitudinal axis of second leg 224, as shown in FIGS. 16 and 18-20, to improve rotation of fastener 244 from the open to the closed position. A longitudinal slot 230 extends through a portion of second leg 224 and a portion of flange 226, but, does not extend all the way to the end of flange 226.

Bolt 246 of fastener 244 extends through slot 230 and nut 252 is threaded onto bolt 246 to retain bolt 246 in slot 230 so that fastener 244 is provided preassembled on bracket 202, which reduces the problem of lost or misplaced parts. In this manner, fastener 244 is movably secured to second leg 224 and can be easily moved between the open position, in which fastener 244 is spaced apart from first leg 204, and the closed position, in which bolt 246 of fastener 244 is positioned within slot 206 in first leg 204.

Bracket assembly 200 can also include other alternative features, any of which could be included individually or in combination, as desired. For example, in FIG. 15, example bracket assembly 200A has a bracket 202A and fastener 244. Like bracket 202, bracket 202A has identical second and third legs 224, 242. However, first leg 204A of bracket 202A includes a protrusion 214 formed on and extending from the outer surface 216 of first leg 204A. Protrusion 214 is positionable within slot 140 of base spacer 134 or slot 162 of flexible cable protection insert 160 when bracket assembly 200A is assembled with cleat assembly 100 to provide support to the base spacer 134 or flexible cable protection insert 160, which may be necessary due to the extreme forces cables 20 can exert during a short-circuit event.

In some installations where space is limited on the underside of the bracket, it may be necessary to invert the bracket for installation to allow access to the nut of the fastener from the top of the bracket. In this instance, example bracket assembly 200B (FIG. 16) can be used, which includes bracket 202B and fastener 244. Bracket 202B is similar to bracket 202, however, in bracket 202B, first leg 204B does not have an inset portion, since bracket 202B is inverted and first leg 204B will no longer receive lower shell 112 of cleat assembly 100. Rather, in bracket 202B, second leg 224B includes inset portion 236 to receive lower shell 112 of cleat assembly 100. In addition, second leg 224B of bracket 202B includes a protrusion 232 formed on and extending from the outer surface 234 of second leg 224B. Protrusion 232 is positionable within slot 140 of base spacer 134 or slot 162 of flexible cable protection insert 160 when bracket assembly 200B is assembled with cleat assembly 100 to provide support to the base spacer 134 or flexible cable protection insert 160. Finally, flange 226B of second leg 224B extends at an acute angle to a longitudinal axis of second leg 224B, rather than perpendicular, to improve rotation of fastener 244 from the open to the closed position.

As shown in FIG. 17, example bracket assembly 200C has a bracket 202C and fastener 244. Like bracket 202, bracket 202C has identical second and third legs 224, 242. However, first leg 204C of bracket 202C again includes protrusion 214 formed on and extending from the outer surface 216 of first leg 204C. In addition, rather than having a slot that extends all the way to the distal end of first leg 204C, bracket 202C has a T-shaped slot 218 that has a longitudinal portion 220 extending through first leg 204C and a transverse portion 222, that is generally perpendicular to longitudinal portion 220, extending across the flange 212C. T-shaped slot 218 does not extend all the way to the end of first leg 204C or flange 212C. Transverse portion 222 is sized such that head 248 of bolt 246 can pass through transverse portion 222 as fastener 244 is rotated from the open to the closed position. Longitudinal portion 220 has a width that is smaller than the diameter of head 248 and is sized to engage square key 250 of bolt 246 to prevent rotation of bolt 246 when fastener 244 is in the closed position.

FIGS. 18-20 show another example bracket 202D. In bracket 202D, first leg 204D includes protrusion 214 formed on and extending from the outer surface 216 of first leg 204D. Protrusion 214 is positionable within slot 140 of base spacer 134 or slot 162 of flexible cable protection insert 160 to provide support to the base spacer 134 or flexible cable protection insert 160, which may be necessary due to the extreme forces cables 20 can exert during a short-circuit event. In addition, second leg 224D has flange 226D that extends at an acute angle to a longitudinal axis of second leg 224D, rather than perpendicular, to improve rotation of fastener 244 from the open to the closed position, and upwardly extending lateral flanges 238 on the sides of second leg 224D. As can be seen in FIG. 19, lateral flanges 238 can be used to engage ladder rung 30 to more tightly secure the bracket assembly to ladder rung 30 and prevent movement of bracket 202D on ladder rung 30. In addition, as shown in FIG. 20, lateral flanges 238 can also include a plurality of teeth 240. Finally, rather than being oriented perpendicular to first and second legs 204D, 224D, third leg 242D is oriented at an acute angle to one of first or second legs 204D, 224D to provide space for flanges 34 of ladder rung 30.

Figure 21:
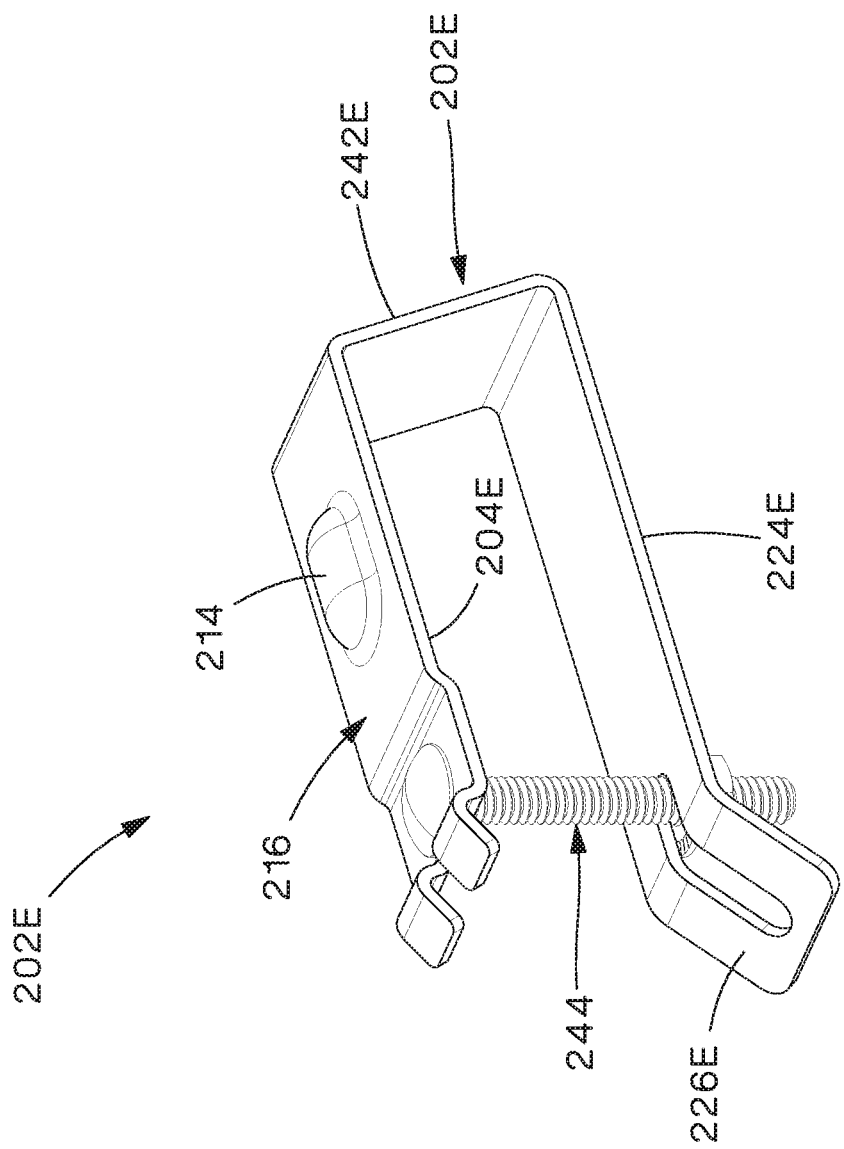
FIG. 21 is a perspective view of another example bracket assembly.
Figure 22:
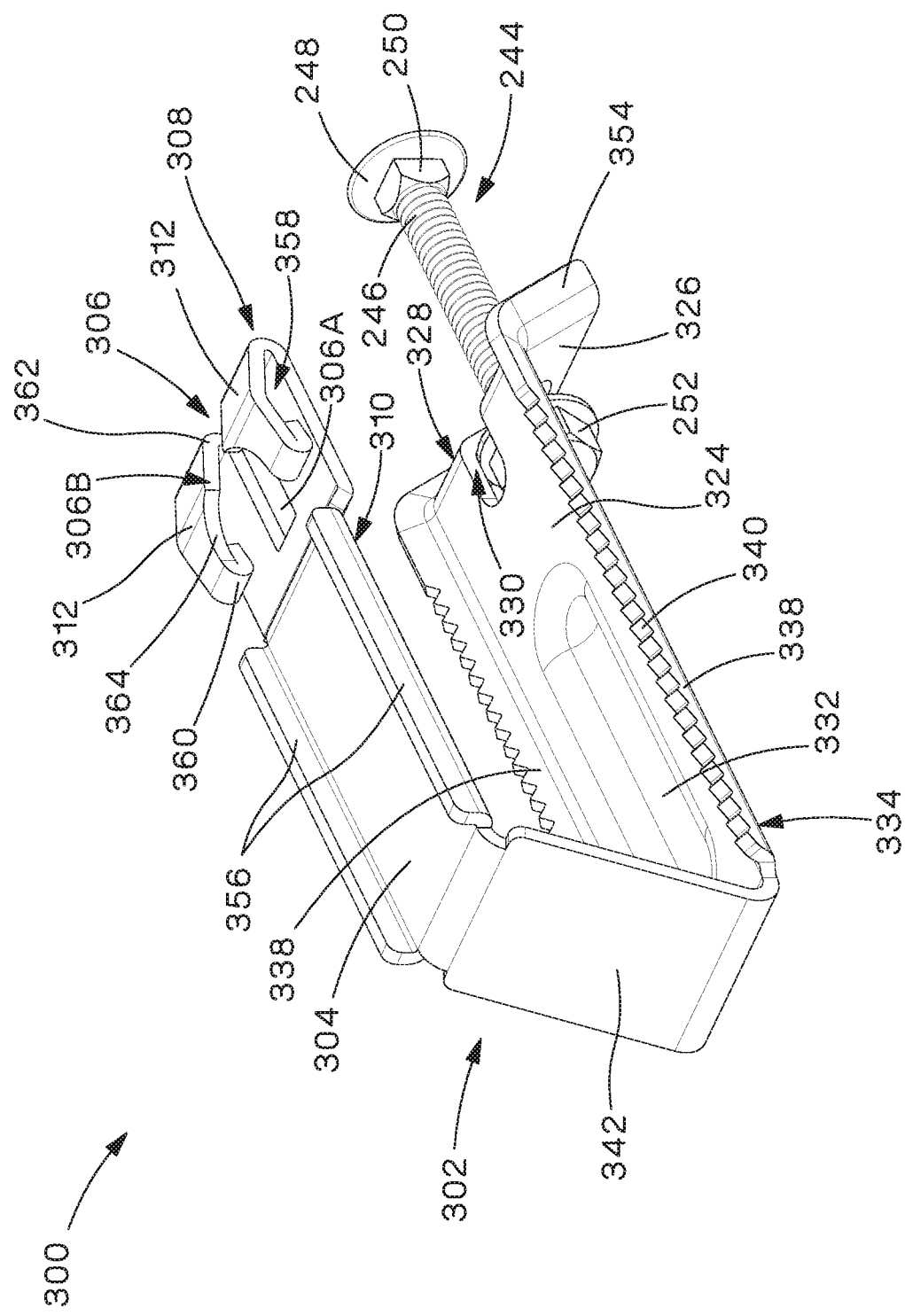
FIG. 22 is a perspective view of another example bracket assembly in an open position.
Figure 23:
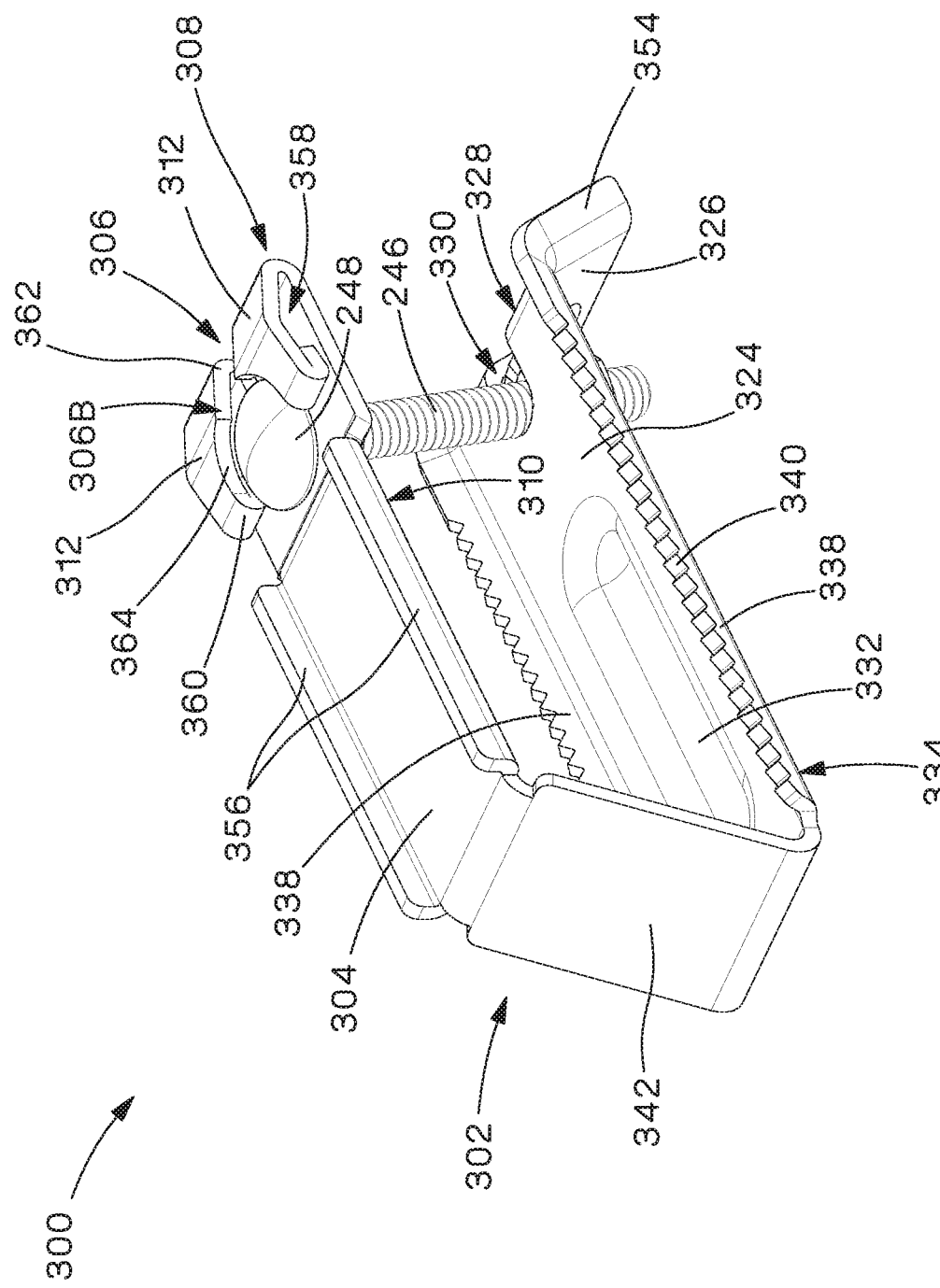
FIG. 23 is a perspective view of the example bracket assembly of FIG. 22 in an intermediate position.

FIG. 21 shows another example bracket assembly 200E having yet another combination of the above features. For example, in bracket assembly 200E, first leg 204E of bracket 202E includes protrusion 214 formed on and extending from the outer surface 216 of first leg 204E, flange 226E of second leg 224E extends at an acute angle to a longitudinal axis of second leg 224E, rather than perpendicular, and third leg 242E is oriented at an acute angle to one of first or second legs 204E, 224E to provide space for flanges 34 of ladder rung 30.

Figure 24:
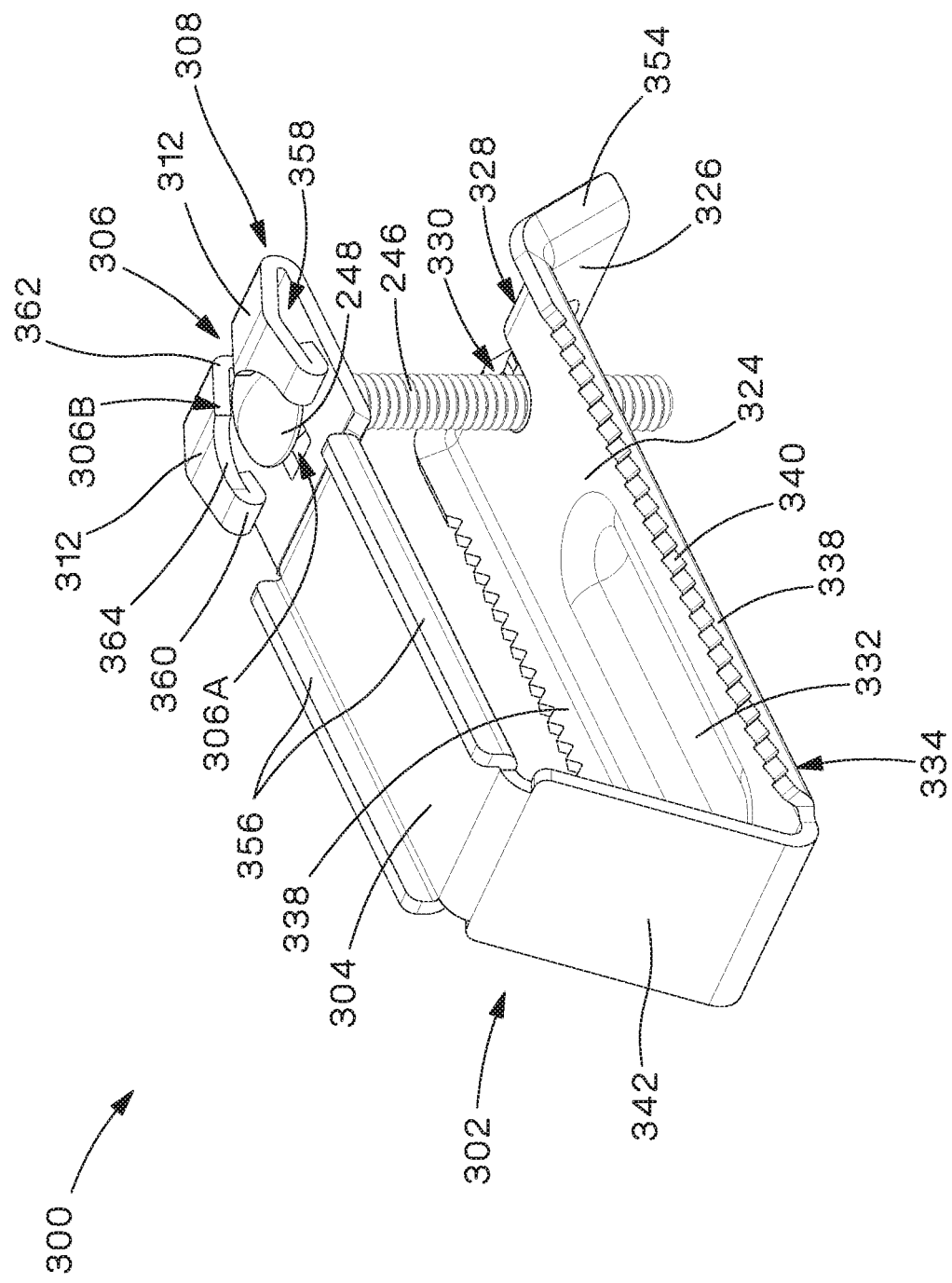
FIG. 24 is a perspective view of the example bracket assembly if FIG. 22 in a closed position.
Figure 25:
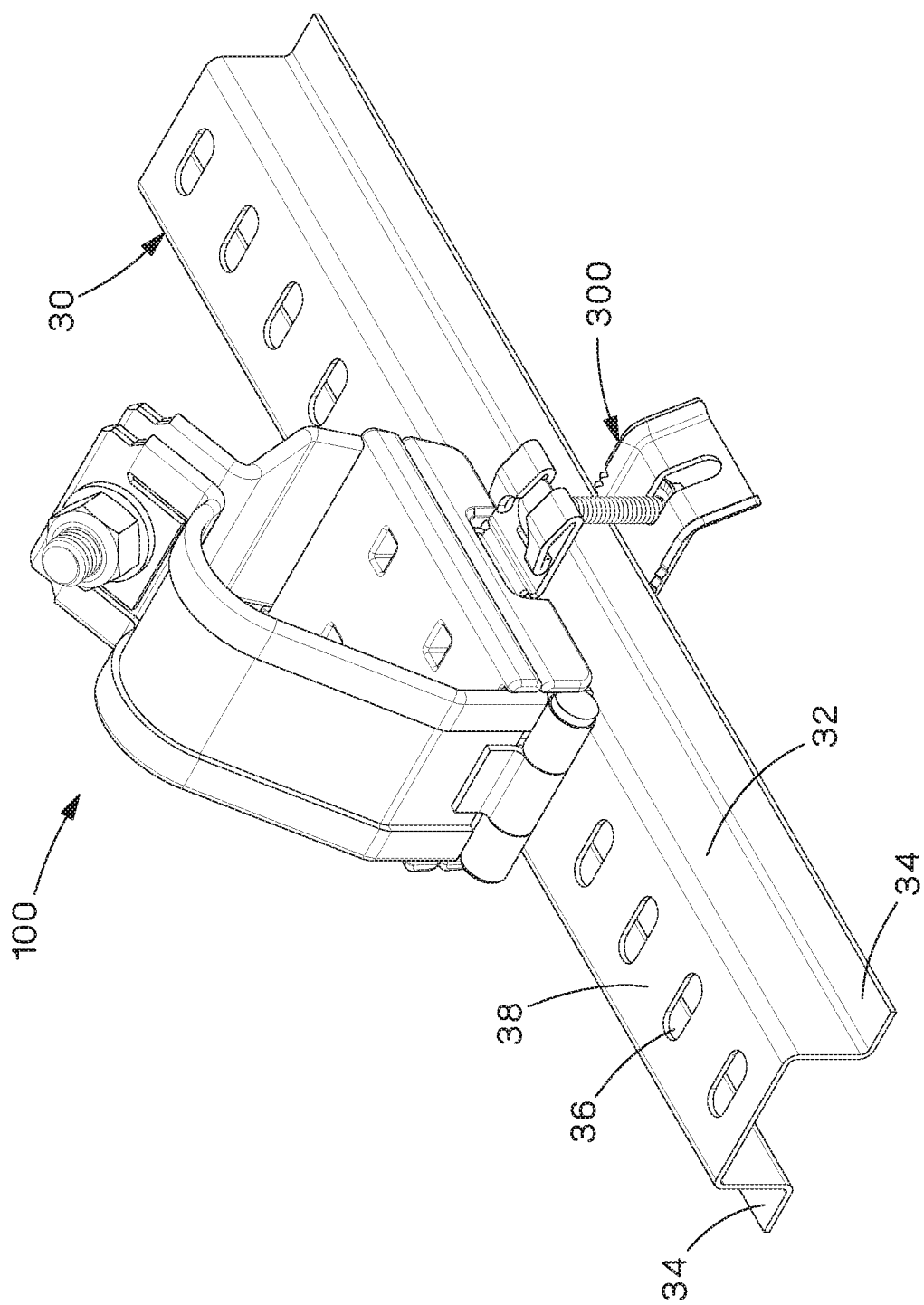
FIG. 25 is a perspective view of another cable management assembly, comprising the cleat assembly of FIG. 8 and the bracket assembly of FIGS. 22-24, secured to a ladder rung.
Figure 26:
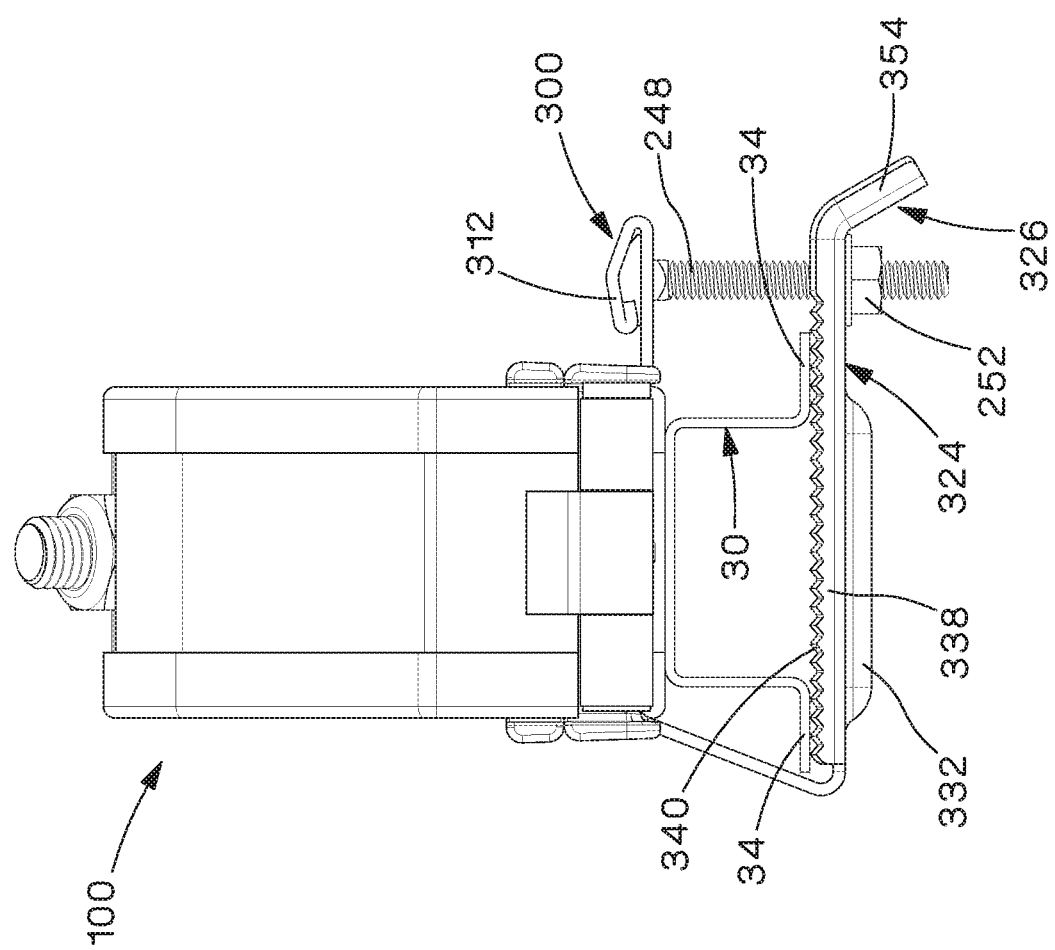
FIG. 26 is a front view of the cable management assembly of FIG. 25.
Figure 27:
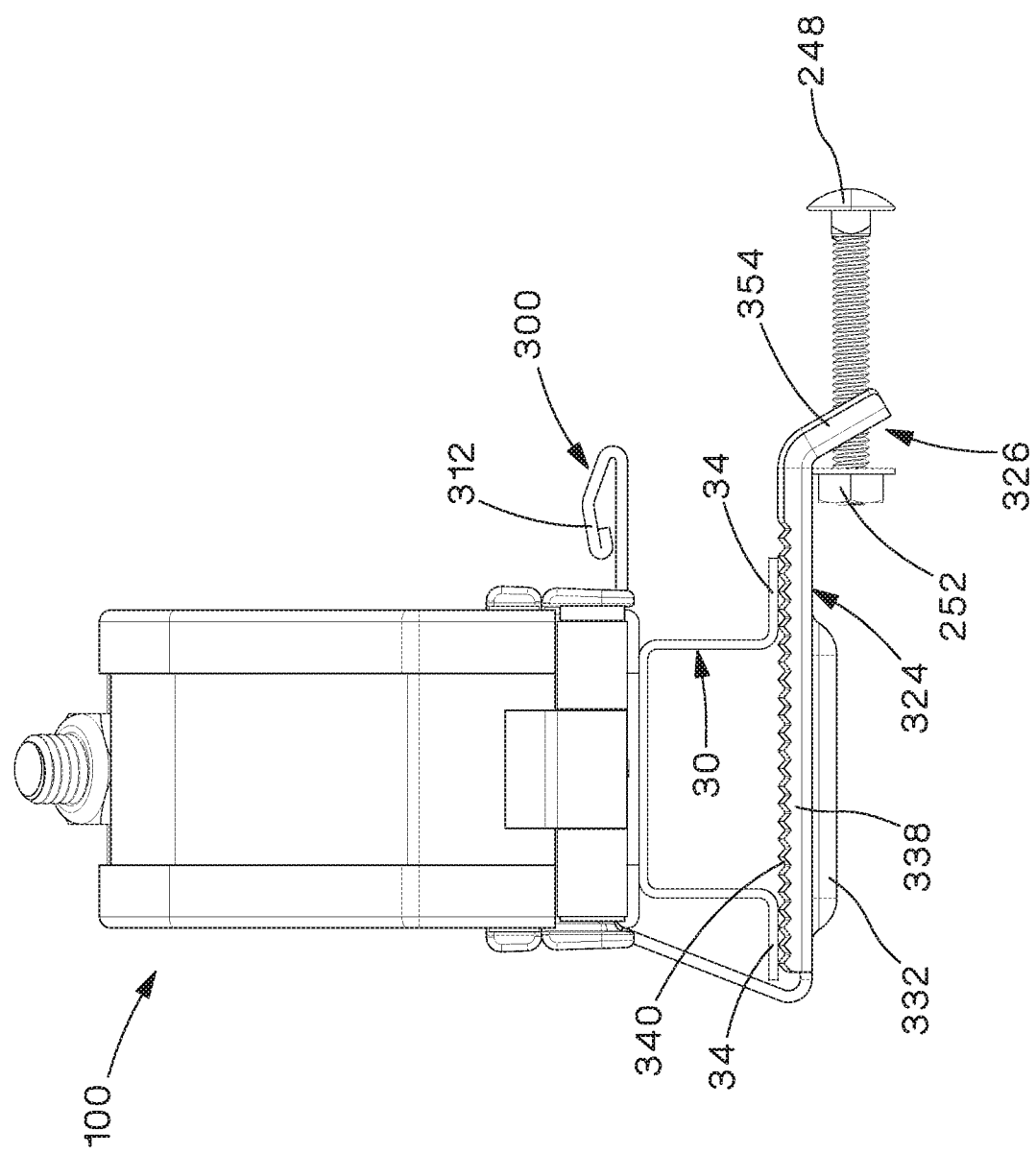
FIG. 27 is a front view of the cable management assembly of FIG. 25 with the bracket assembly in an open position.
Figure 28:
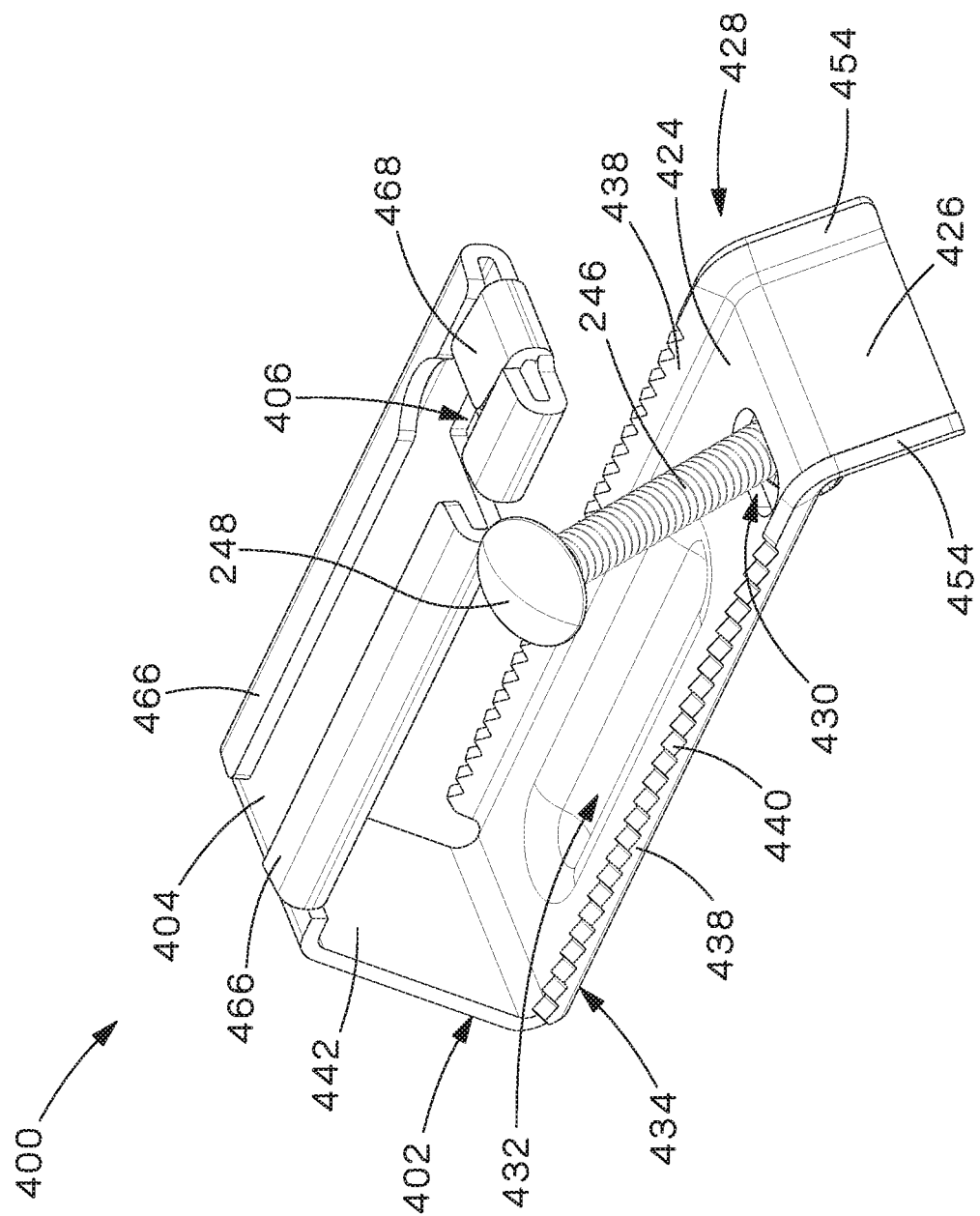
FIG. 28 is a perspective view of another example bracket assembly in an open position.
Figure 29:
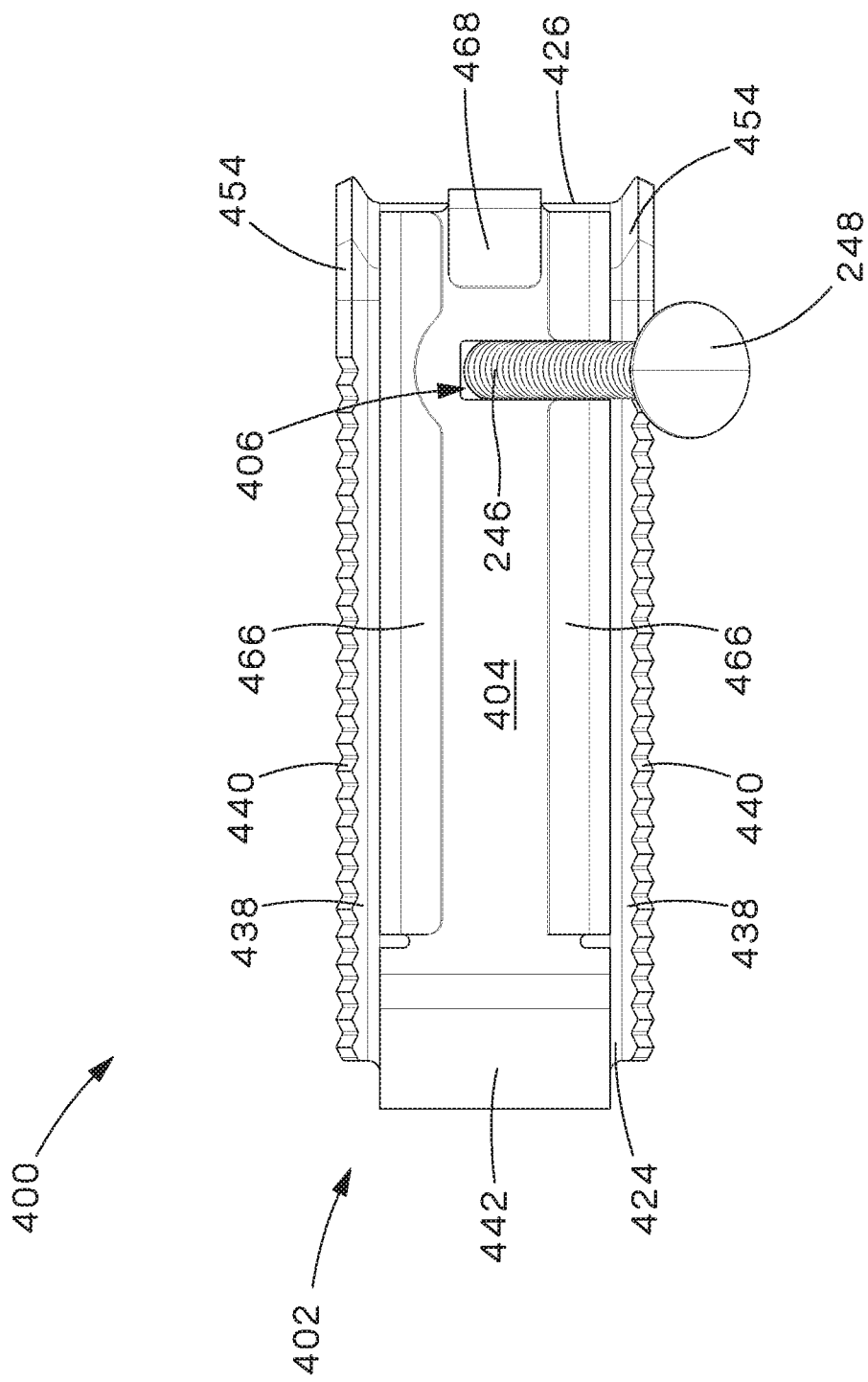
FIG. 29 is a top view of the bracket assembly of FIG. 28.

Referring to FIGS. 22-27, another example bracket assembly 300 is shown in an open position (FIG. 22), an intermediate position (FIG. 23), and a closed position (FIG. 24). FIGS. 25-27 show bracket assembly 300 installed on ladder rung 30 with cleat assembly 100. In FIGS. 25-26, bracket assembly 300 is in the closed position and in FIG. 27, bracket assembly 300 is in the open position.

Bracket assembly 300 includes a generally C-shaped bracket 302 and fastener 244 described above. Bracket assembly 300 is insertable through cleat assembly 100 to secure cleat assembly 100 to ladder rung 30, as described in more detail below. Bracket 302 has first and second legs 304, 324 that extend generally parallel to each other and a third leg 342 that interconnects first and second legs 304, 324. Third leg 342 is oriented at an obtuse angle to first leg 304 and at an acute angle to second leg 324 to provide space for flanges 34 of ladder rung 30. Fastener 244 is securable between first and second legs 304, 324.

First leg 304 can have an inset portion 310 configured to receive lower shell 112 of cleat assembly 100 and upwardly extending lateral flanges 356 that extend from the sides of first leg 304. Lateral flanges 356 are positionable within slot 140 of base spacer 134 or slot 162 of flexible cable protection insert 160 when bracket assembly 300 is assembled with cleat assembly 100 to provide support to the base spacer 134 or flexible cable protection insert 160, which may be necessary due to the extreme forces cables 20 can exert during a short-circuit event.

Flange 312 extends from distal end 308 of first leg 304 and is bent backwards to extend back over first leg 304 and create a gap 358 between flange 312 and first leg 304. Flange 312 can also have a hemmed or folded end 360 to assist in supporting flange 312 in a spaced apart relationship to first leg 304 and maintain gap 358.

A longitudinal slot 306 has a first portion 306A that extends into first leg 304 from distal end 308 and a second portion 306B that extends into flange 312 from distal end 308. First portion 306A of slot 306 is dimensioned to engage a square key 250 beneath head 248 of bolt 246 to prevent bolt 246 from rotating when bracket assembly 300 is in the closed position, making the installation process easier, and head 248 of bolt 246 has a diameter that is larger than the width of first portion 306A of slot 306. Second portion 306B of slot 306 has a first section 362 and a second section 364. First section 362 is generally linear and has a width generally the same as first portion 306A. Second section 364 is semi-circular and has a diameter that is slightly larger than the diameter of head 248 of bolt 246 to receive head 248.

Second leg 324 includes a flange 326 that extends at an angle from a distal end 328 of second leg 324. In the example shown in FIGS. 22-27, flange 326 extends at an acute angle to a longitudinal axis of second leg 324, rather than perpendicular, to improve rotation of fastener 244 from the open to the closed position. A longitudinal slot 330 extends through a portion of second leg 324 and a portion of flange 326 but does not extend all the way to the end of flange 326. Protrusion 332 is formed on and extends from the outer surface 334 of second leg 324 to add strength to second leg 324 and keep second leg 324 from bending when fastener 244 is tightened. Upwardly extending lateral flanges 354 extend from the sides of flange 326 and, in the example shown, interconnect with upwardly extending lateral flanges 338 extending from the sides of second leg 324. Lateral flanges 338 also include a plurality of teeth 340. As can be seen in FIGS. 25-27, lateral flanges 338 and teeth 340 can be used to engage ladder rung 30 to more tightly secure bracket assembly 300 to ladder rung 30 and prevent movement of bracket 302 on ladder rung 30.

Bolt 246 of fastener 244 extends through slot 330 and nut 252 is threaded onto bolt 246 to retain bolt 246 in slot 330 so that fastener 244 is provided preassembled on bracket 302, which reduces the problem of lost or misplaced parts. In this manner, fastener 244 is movably secured to second leg 324 and can be easily moved between the open position, in which fastener 244 is spaced apart from first leg 304, and the closed position, in which bolt 246 of fastener 244 is positioned within slot 306 in first leg 304.

As bolt 246 of fastener 244 is rotated up from the open position (FIG. 22) to the intermediate position (FIG. 23), head 248 of bolt 246 is brought over flange 312 and naturally falls through second section 364 of second portion 306B of slot 306, where square key 250 of bolt 246 engages first portion 306A of slot to prevent rotation of bolt 246. First portion 306A of slot 306 in first leg 304 is longitudinally offset from second section 364 of second portion 306B to allow head 248 of bolt 246 to drop through second section 364 and the bolt to move from an angled, intermediate position (FIG. 23) to a vertical, closed position (FIG. 24). When moved to the closed position, head 248 of bolt 246 is captured underneath flange 312, which retains head 248 and prevents bolt 246 from dislodging or moving upwards, sideways, or forward once nut 252 is tightened. Prevention of bolt 246 from dislodging or moving can be especially important during a short-circuit event, where movement of cables 20 and deformation of bracket 302 can potentially allow bolt 246 to come loose.

Figure 30:
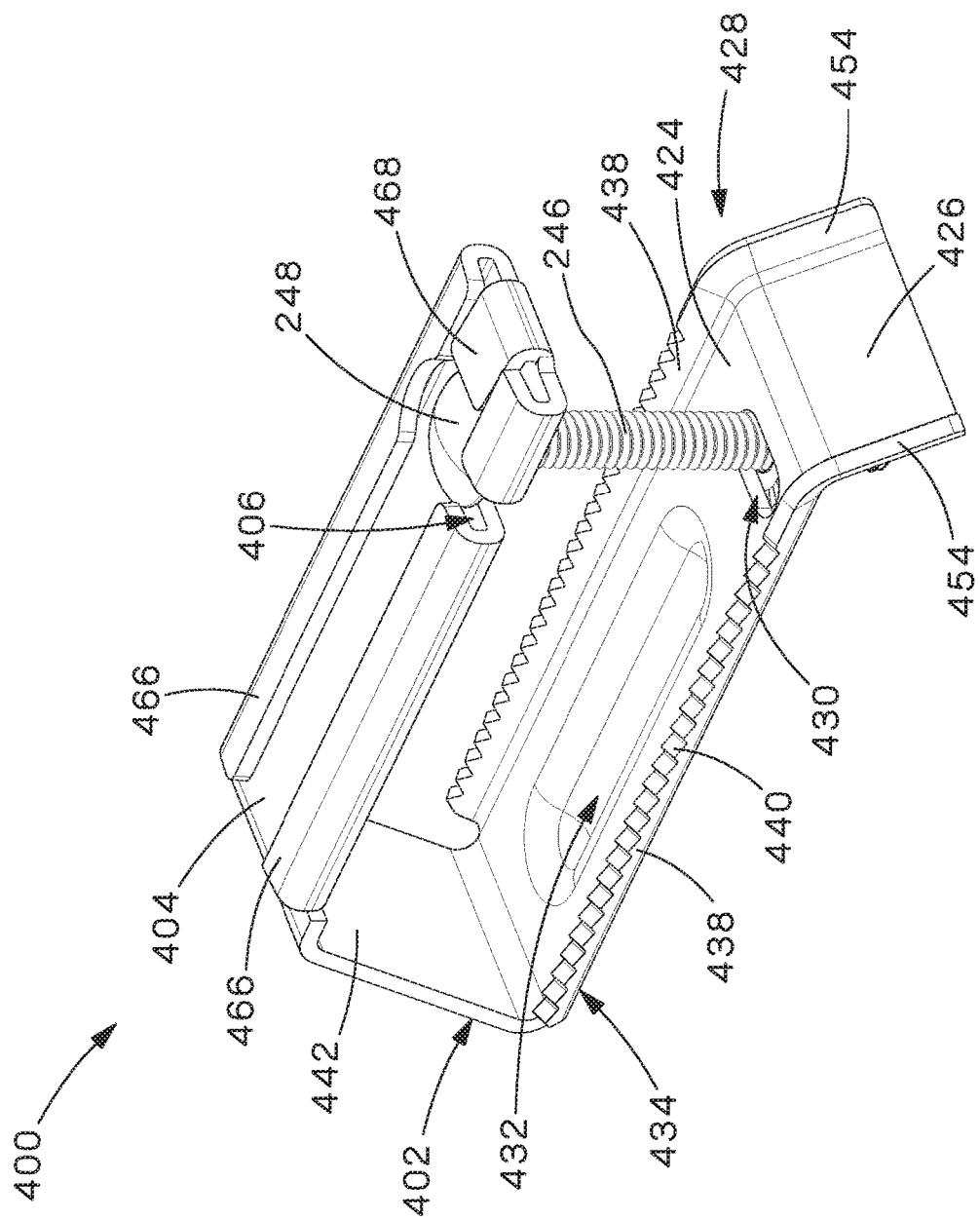
FIG. 30 is a perspective view of the bracket assembly of FIG. 28 in a closed position.
Figure 31:
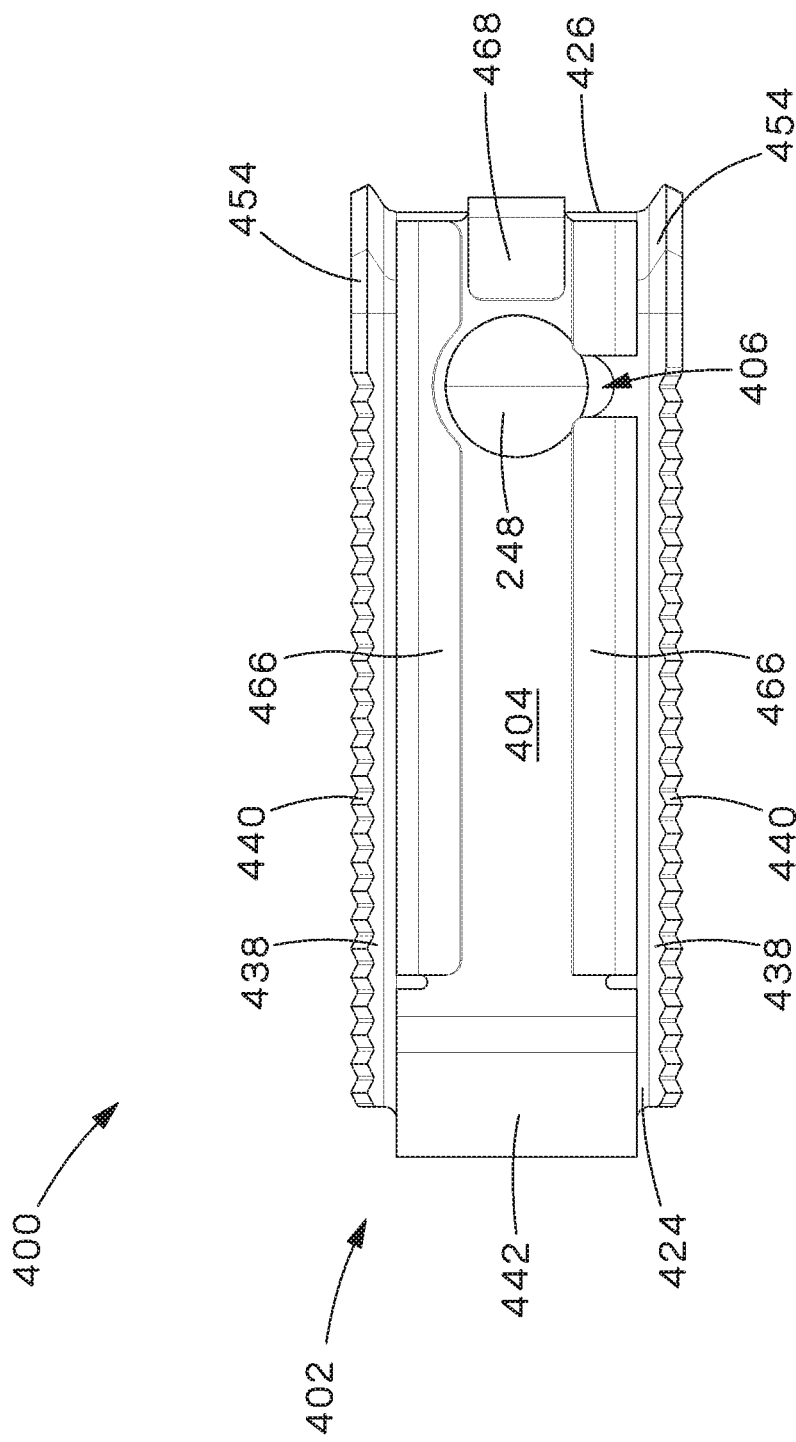
FIG. 31 is a top view of the bracket assembly of FIG. 30.
Figure 32:
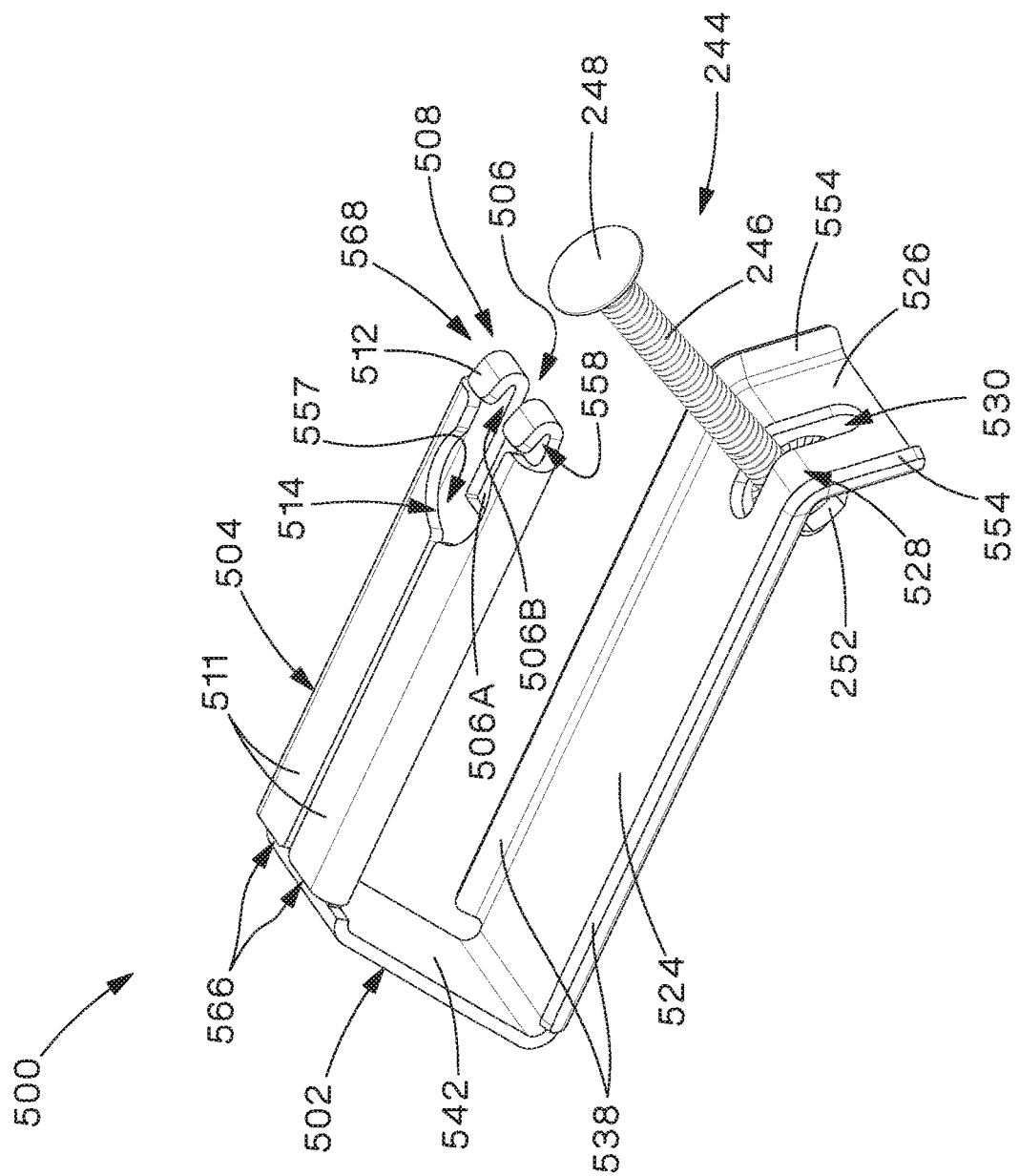
FIG. 32 is a perspective view of another example bracket assembly in an open position.
Figure 33:
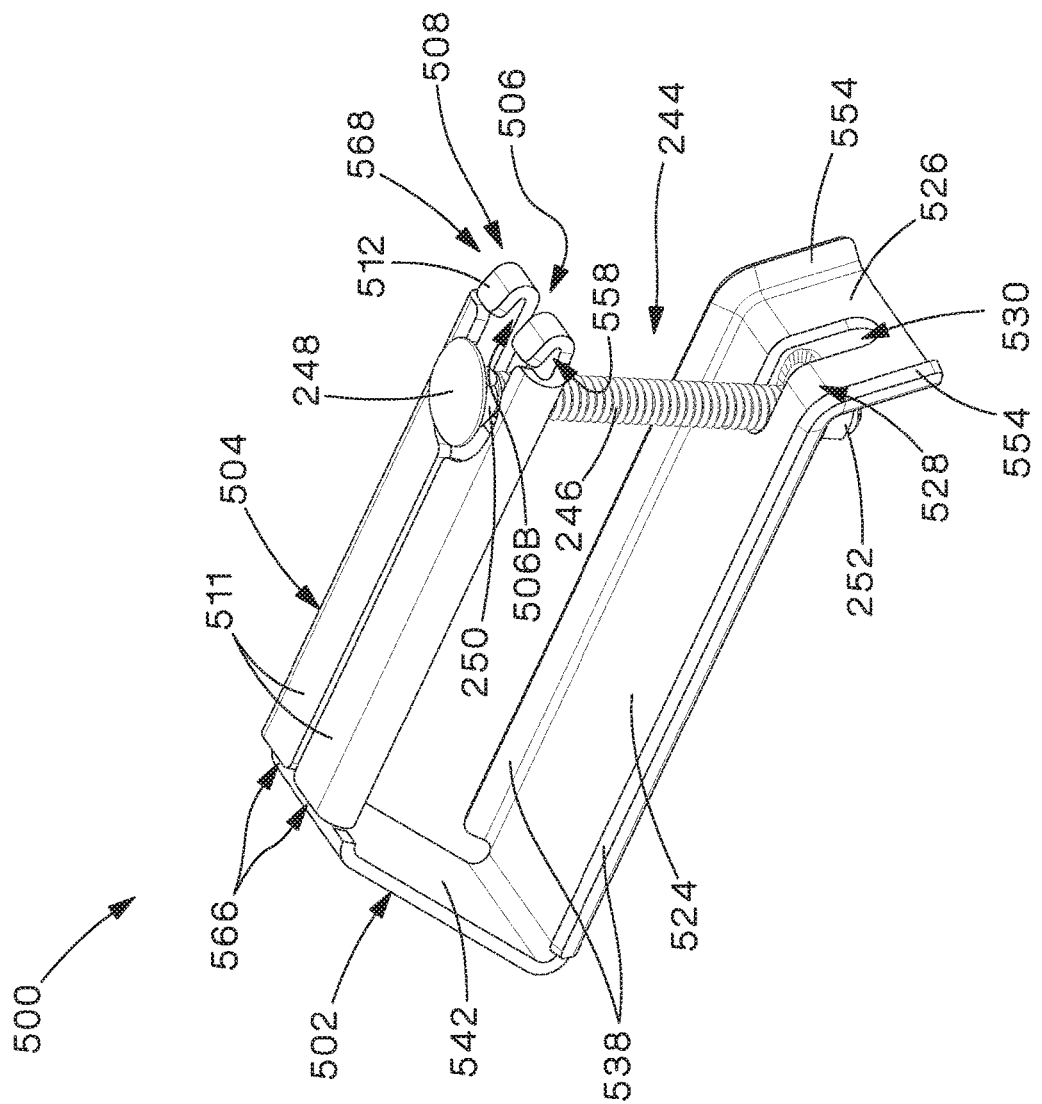
FIG. 33 is a perspective view of the example bracket assembly of FIG. 32 in an intermediate position.

Referring to FIGS. 28-31, another example bracket assembly 400 is shown in an open position (FIGS. 28-29) and a closed position (FIGS. 30-31). Bracket assembly 400 includes a generally C-shaped bracket 402 and fastener 244 described above. Bracket assembly 400 is insertable through cleat assembly 100 to secure cleat assembly 100 to ladder rung 30, as described in more detail below. Bracket 402 has first and second legs 404, 424 that extend generally parallel to each other and a third leg 442 that interconnects first and second legs 404, 424. Third leg 442 is oriented at an obtuse angle to first leg 404 and at an acute angle to second leg 424 to provide space for flanges 34 of ladder rung 30. Fastener 244 is securable between first and second legs 404, 424.

First leg 404 can have hemmed or folded edges 466 and/or a hemmed or folded end 468 to provide additional strength to first leg 404. Hemmed or folded edges 466 and hemmed or folded end 468 also capture head 248 of bolt 246 when bracket assembly 300 is in the closed position to prevent side-to-side and front-to-back movement of head 248. Hemmed or fold edges 466 are also positionable within slot 140 of base spacer 134 or slot 162 of flexible cable protection insert 160 when bracket assembly 300 is assembled with cleat assembly 100 to provide support to the base spacer 134 or flexible cable protection insert 160, which may be necessary due to the extreme forces cables 20 can exert during a short-circuit event.

A transverse slot 406 extends into first leg 404 from a side of first leg 404 and through one of the hemmed or folded edges 466. Slot 406 is dimensioned to engage a square key 250 beneath head 248 of bolt 246 to prevent bolt 246 from rotating when bracket assembly 200 is in the closed position, making the installation process easier, and head 248 of bolt 246 has a diameter that is larger than the width of slot 406.

Second leg 424 includes a flange 426 that extends at an angle from a distal end 428 of second leg 424. In the example shown in FIGS. 28-31, flange 426 extends at an acute angle to a longitudinal axis of second leg 424, rather than perpendicular, to improve rotation of fastener 244 from the open to the closed position. A transverse slot 430 extends across second leg 424, but, does not extend all the way to the edges of second leg 424. Protrusion 432 is formed on and extends from the outer surface 434 of second leg 424 to add strength to second leg 424 and keep second leg 424 from bending when fastener 244 is tightened. Upwardly extending lateral flanges 454 extend from the sides of flange 426 and, in the example shown, interconnect with upwardly extending lateral flanges 438 extending from the sides of second leg 424. Lateral flanges 438 also include a plurality of teeth 440. Lateral flanges 438 and teeth 440 can be used to engage ladder rung 30 to more tightly secure bracket assembly 400 to ladder rung 30 and prevent movement of bracket 402 on ladder rung 30.

Bolt 246 of fastener 244 extends through slot 430 and nut 252 is threaded onto bolt 246 to retain bolt 246 in slot 430 so that fastener 244 is provided preassembled on bracket 402, which reduces the problem of lost or misplaced parts. In this manner, fastener 244 is movably secured to second leg 424 and can be easily moved between the open position, in which fastener 244 is spaced apart from first leg 404, and the closed position, in which bolt 246 of fastener 244 is positioned within slot 406 in first leg 404.

As bolt 246 of fastener 244 is rotated in a transverse direction from the open position (FIGS. 28-29) to the closed position (FIGS. 30-31), head 248 of bolt 246 is brought over hemmed or folded edge 466 and is lowered such that square key 250 of bolt 246 engages slot 406 to prevent rotation of bolt 246. Nut 252 is then tightened on bolt 246 to secure bracket assembly 400.

Figure 34:
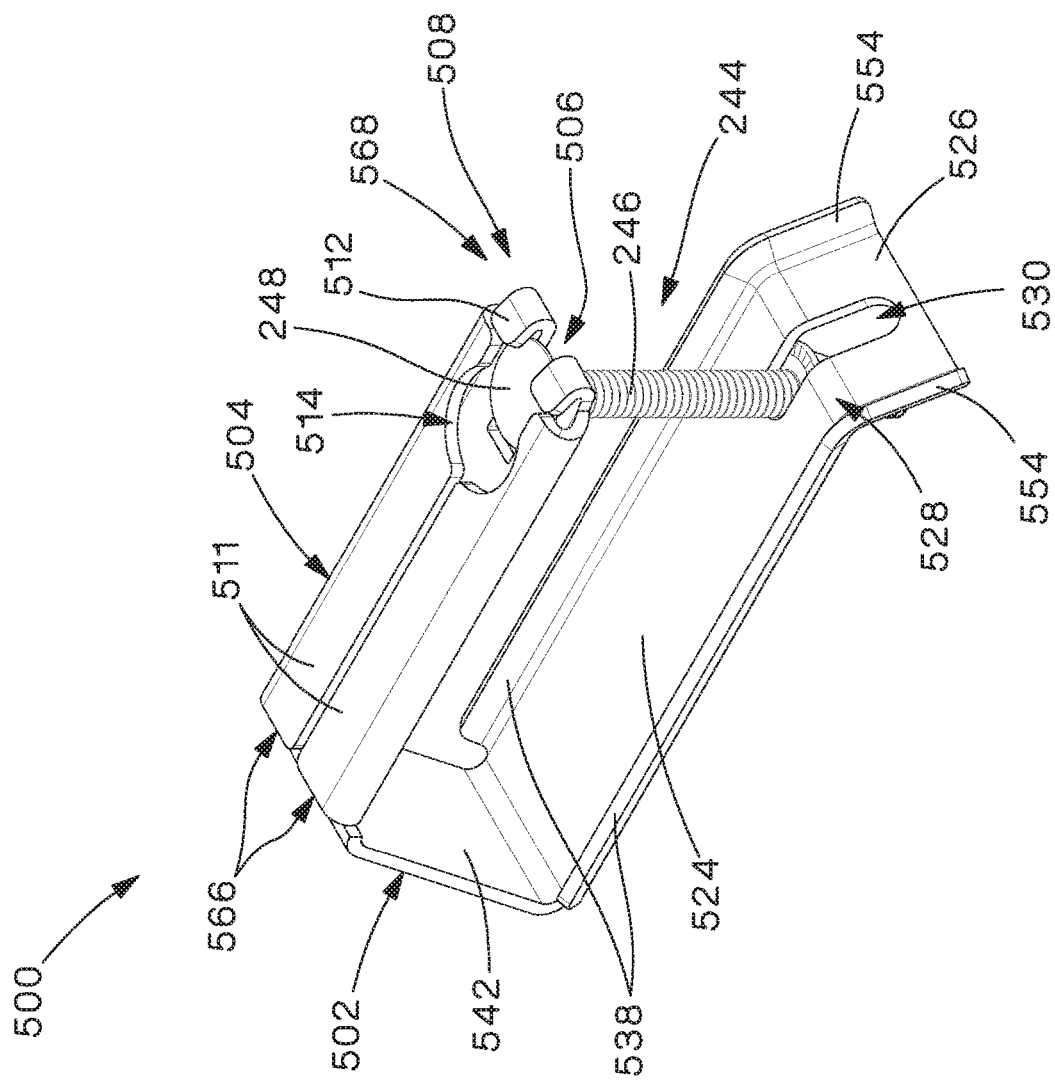
FIG. 34 is a perspective view of the example bracket assembly of FIG. 32 in a closed position.
Figure 35:
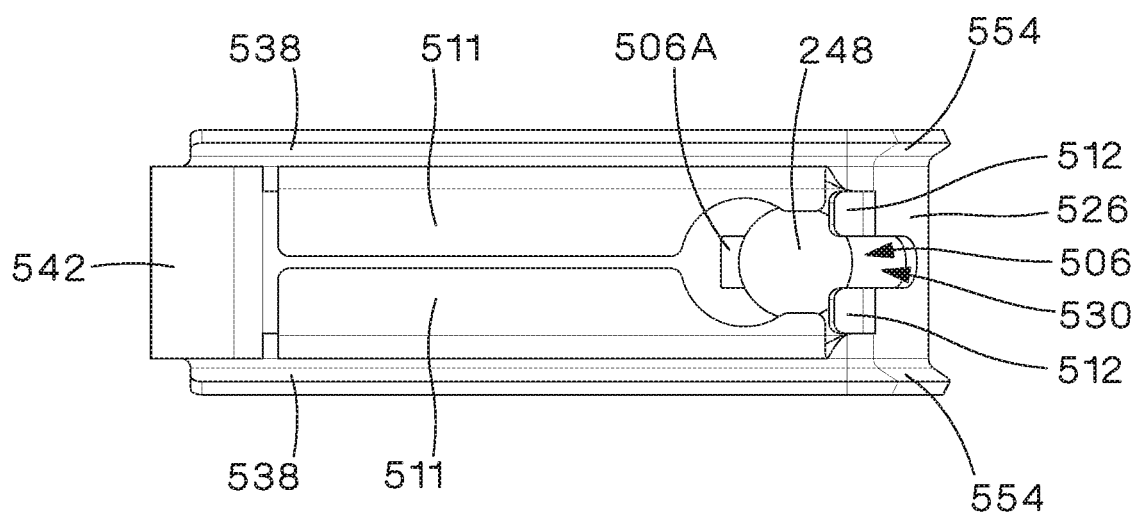
FIG. 35 is a top view of the bracket assembly of FIG. 34.
Figure 36:
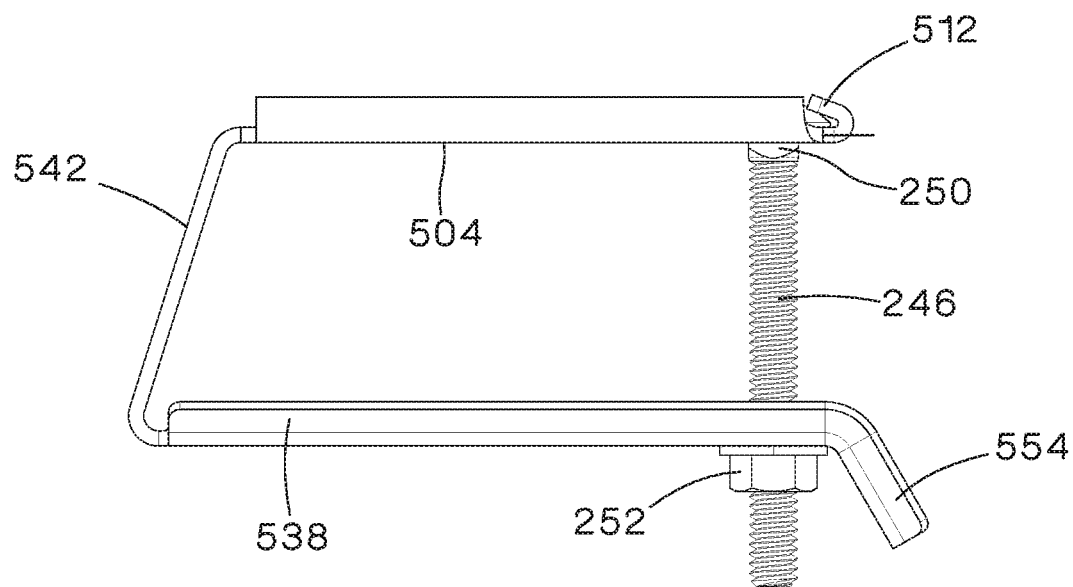
FIG. 36 is a front view of the bracket assembly of FIG. 34.
Figure 37:
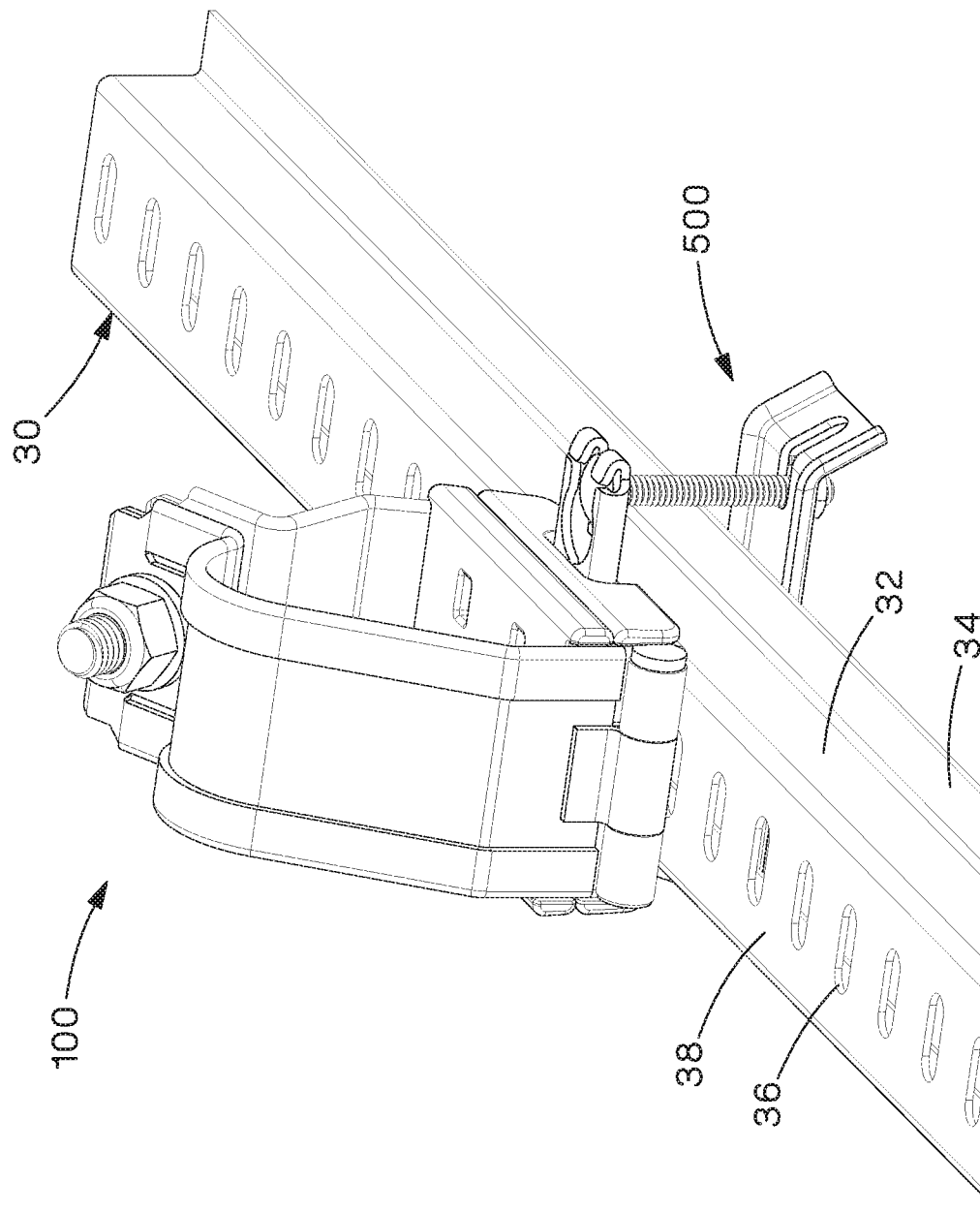
FIG. 37 is a perspective view of another cable management assembly, comprising the cleat assembly of FIG. 8 and the bracket assembly of FIGS. 32-36, secured to a ladder rung.

Referring to FIGS. 32-37, another example bracket assembly 500 is shown in an open position (FIG. 32), an intermediate position (FIG. 33), and a closed position (FIGS. 34-36). FIG. 37 shows bracket assembly 500 installed on ladder rung 30 with cleat assembly 100.

Bracket assembly 500 includes a generally C-shaped bracket 502 and fastener 244 described above. Bracket assembly 500 is insertable through cleat assembly 100 to secure cleat assembly 100 to ladder rung 30, as described in more detail below. Bracket 502 has first and second legs 504, 524 that extend generally parallel to each other and a third leg 542 that interconnects first and second legs 504, 524. Third leg 542 is oriented at an obtuse angle to first leg 504 and at an acute angle to second leg 524 to provide space for flanges 34 of ladder rung 30. Fastener 244 is securable between first and second legs 504, 524.

First leg 504 can have hemmed or folded edges 566 and a hemmed or folded end 568 to provide additional strength to first leg 504. Hemmed or folded edges 566 and hemmed or folded end 568 also capture head 248 of bolt 246 when bracket assembly 500 is in the closed position to prevent movement of head 248. Hemmed or fold edges 566 are also positionable within slot 140 of base spacer 134 or slot 162 of flexible cable protection insert 160 when bracket assembly 500 is assembled with cleat assembly 100 to provide support to the base spacer 134 or flexible cable protection insert 160, which may be necessary due to the extreme forces cables 20 can exert during a short-circuit event.

Hemmed or folded edges 566 each form a flange 511 that extends from the sides of first leg 504 and are bent backwards to extend back over first leg 504 and create gaps 557 between flanges 511 and first leg 504. Similarly, hemmed or folded end 568 forms a flange 512 that extends from distal end 508 of first leg 504 and is bent backwards to extend back over first leg 504 and create a gap 558 between flange 512 and first leg 504. Flanges 511 of hemmed or folded edges 566 each have a cutout section that together form a semicircular opening 514 that has a diameter that is slightly larger than the diameter of head 248 of bolt 246 to receive head 248.

A longitudinal slot 506 has a first portion 506A that extends into first leg 504 from distal end 508 and a second portion 506B that extends into flange 512 from distal end 508. First portion 506A of slot 506 is dimensioned to engage a square key 250 beneath head 248 of bolt 246 to prevent bolt 246 from rotating when bracket assembly 500 is in the closed position, making the installation process easier, and head 248 of bolt 246 has a diameter that is larger than the width of first portion 506A of slot 306. Second portion 506B is generally linear and has a width generally the same a first portion 506A.

Second leg 524 includes a flange 526 that extends at an angle from a distal end 528 of second leg 524. In the example shown in FIGS. 32-37, flange 526 extends at an acute angle to a longitudinal axis of second leg 524, rather than perpendicular, to improve rotation of fastener 244 from the open to the closed position. A longitudinal slot 530 extends through a portion of second leg 524 and a portion of flange 526 but does not extend all the way to the end of flange 526. Upwardly extending lateral flanges 554 extend from the sides of flange 526 and, in the example shown, interconnect with upwardly extending lateral flanges 538 extending from the sides of second leg 524. Lateral flanges 538 can be used to engage ladder rung 30 to more tightly secure bracket assembly 500 to ladder rung 30 and prevent movement of bracket 502 on ladder rung 30.

Bolt 246 of fastener 244 extends through slot 530 and nut 252 is threaded onto bolt 246 to retain bolt 246 in slot 530 so that fastener 244 is provided preassembled on bracket 502, which reduces the problem of lost or misplaced parts. In this manner, fastener 244 is movably secured to second leg 524 and can be easily moved between the open position, in which fastener 244 is spaced apart from first leg 504, and the closed position, in which bolt 246 of fastener 244 is positioned within slot 506 in first leg 304.

As bolt 246 of fastener 244 is rotated up from the open position (FIG. 32) to the intermediate position (FIG. 33), head 248 of bolt 246 is brought over flange 512. Head 248 then naturally falls through semi-circular opening 514, where square key 250 of bolt 246 engages first portion 506A of slot 506 to prevent rotation of bolt 246. First portion 506A of slot 506 in first leg 504 is longitudinally offset from semi-circular opening 514 to allow head 248 of bolt 246 to drop through semi-circular opening 564 at an angled position be moved to the vertical, closed position (FIGS. 34-36). As best seen in FIGS. 34 and 35, when moved to the closed position, head 248 of bolt 246 is positioned in gaps 557, 558 and is captured underneath flanges 511, 512, which retains head 248 and prevents bolt 246 from dislodging or moving upwards, sideways, or forward once nut 252 is tightened. Prevention of bolt 246 from dislodging or moving can be especially important during a short-circuit event, where movement of cables 20 and deformation of bracket 502 can potentially allow bolt 246 to come loose.

To install cable management assembly 10, cleat assembly 100/100A is positioned and centered on ladder rung 30 and cables 20, in a trefoil or other arrangement, are positioned within cleat assembly 100/100A. Alternatively, if cables 20 are already in place on ladder rung 30, cleat assembly 100/100A could be placed around cables 20 adjacent ladder rung 30 and slid into position, centered, over ladder rung 30 by lifting cables 20 off ladder rung 30.

Figure 38:
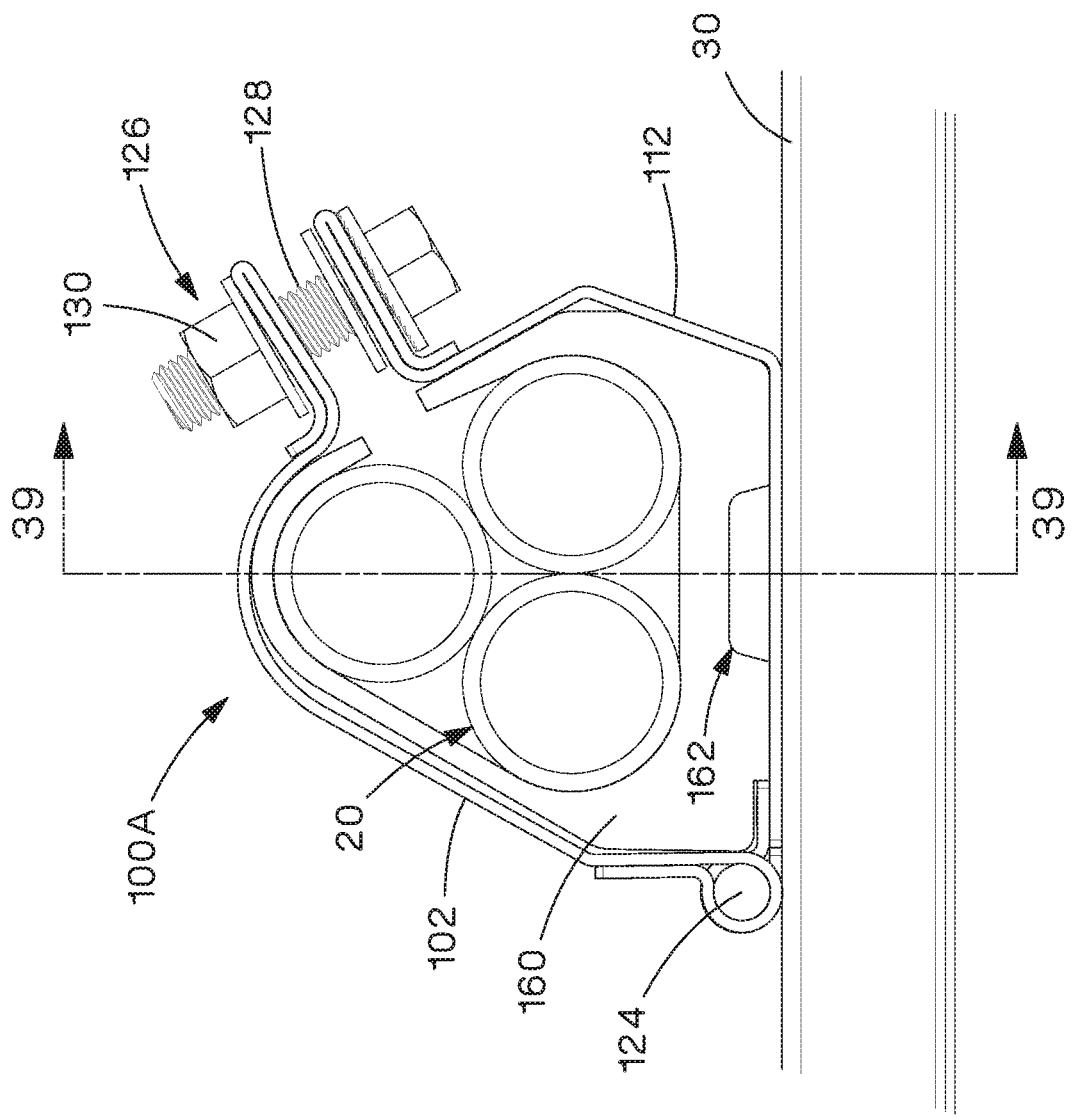
FIG. 38 is a side view of the cleat assembly of the cable management assembly of FIG. 10 positioned adjacent a ladder rung.

Cleat assembly 100/100A is then rotated to the closed position and secured (FIG. 38). In the described examples, cleat assembly 100/100A is secured by inserting bolt 128 through holes 110, 120 in upper and lower shells 102, 112 and threading nut 130 onto bolt 128 to secure upper and lower shells 102, 112 when rotated into a closed position.

Figure 40:
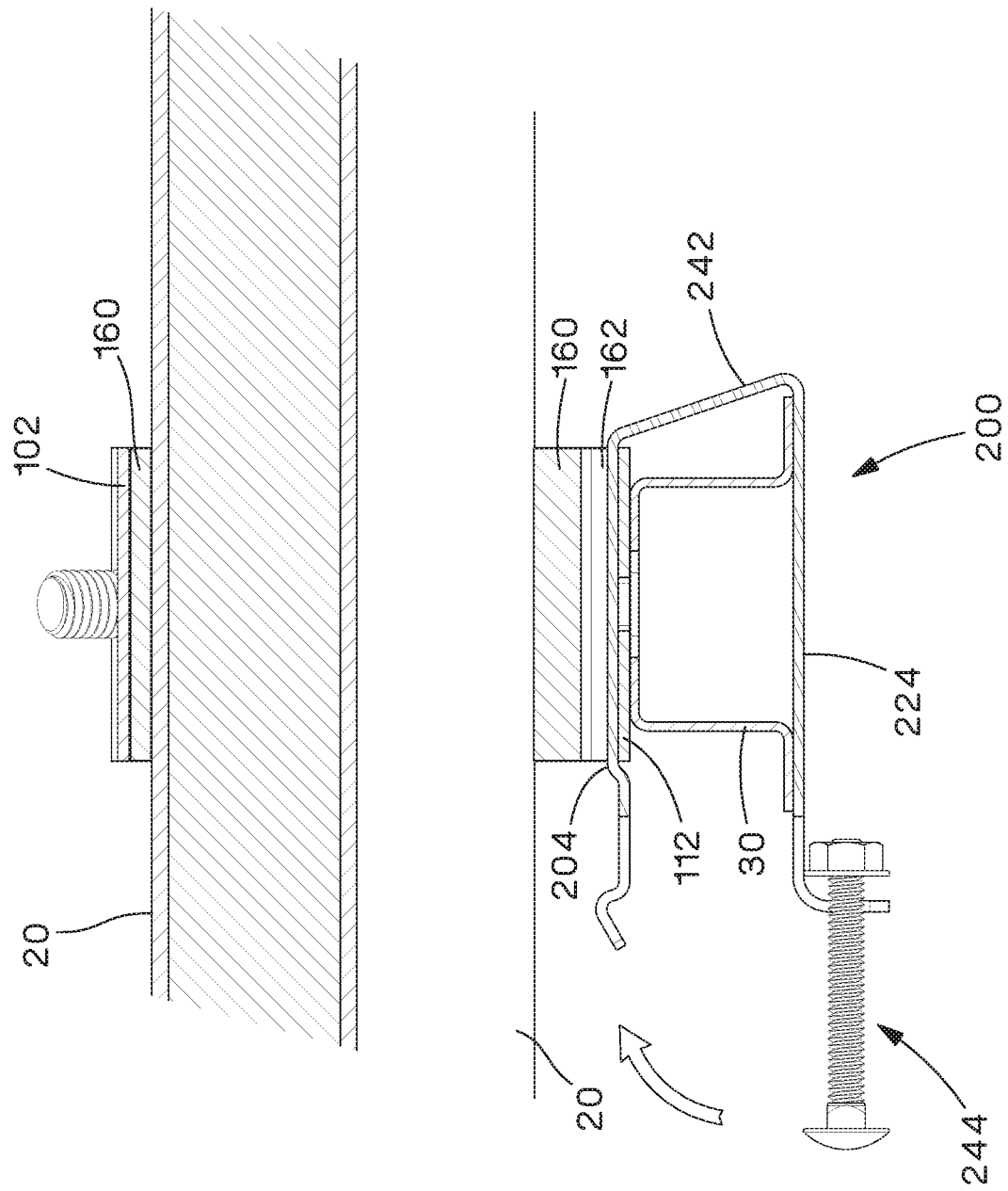
FIG. 40 is a cross-sectional view of the cleat assembly and bracket assembly of FIG. 39 with the bracket assembly in an open position and engaging the bracket assembly.

Once cables 20 have been secured in cleat assembly 100/100A and cleat assembly 100/100A has been positioned on ladder rung 30, bracket assembly 200 can be installed to secure cleat assembly 100/100A to ladder rung 30. To do this, bracket assembly 200 is moved to the open position (FIG. 11) and first leg 204 is aligned with slot 162 in flexible cable protection insert 160 (FIG. 39), or slot 140 in base spacer 134. While installation of bracket assembly 200 is described herein for simplicity, the same installation process can be used for any of the bracket assemblies 200A, 200B, 200C, 200D, 200E, 300, 400, 500 described herein. First leg 204 of bracket assembly 200 is then inserted through slot 162 in flexible cable protection insert 160, or slot 140 in base spacer 134, and around ladder rung 30 (FIG. 40). As shown in FIGS. 15 and 17-21 and described above, first leg 204 can also have protrusion 214 (or lateral flanges 354 of first leg 304, or hemmed or folded edges 466, 566 of first legs 404, 504) that is/are positioned within slot 162 in flexible cable protection insert 160, or slot 140 in base spacer 134, when bracket assembly 200 is inserted through slot 162 in flexible cable protection insert 160, or slot 140 in base spacer 134.

Figure 41:
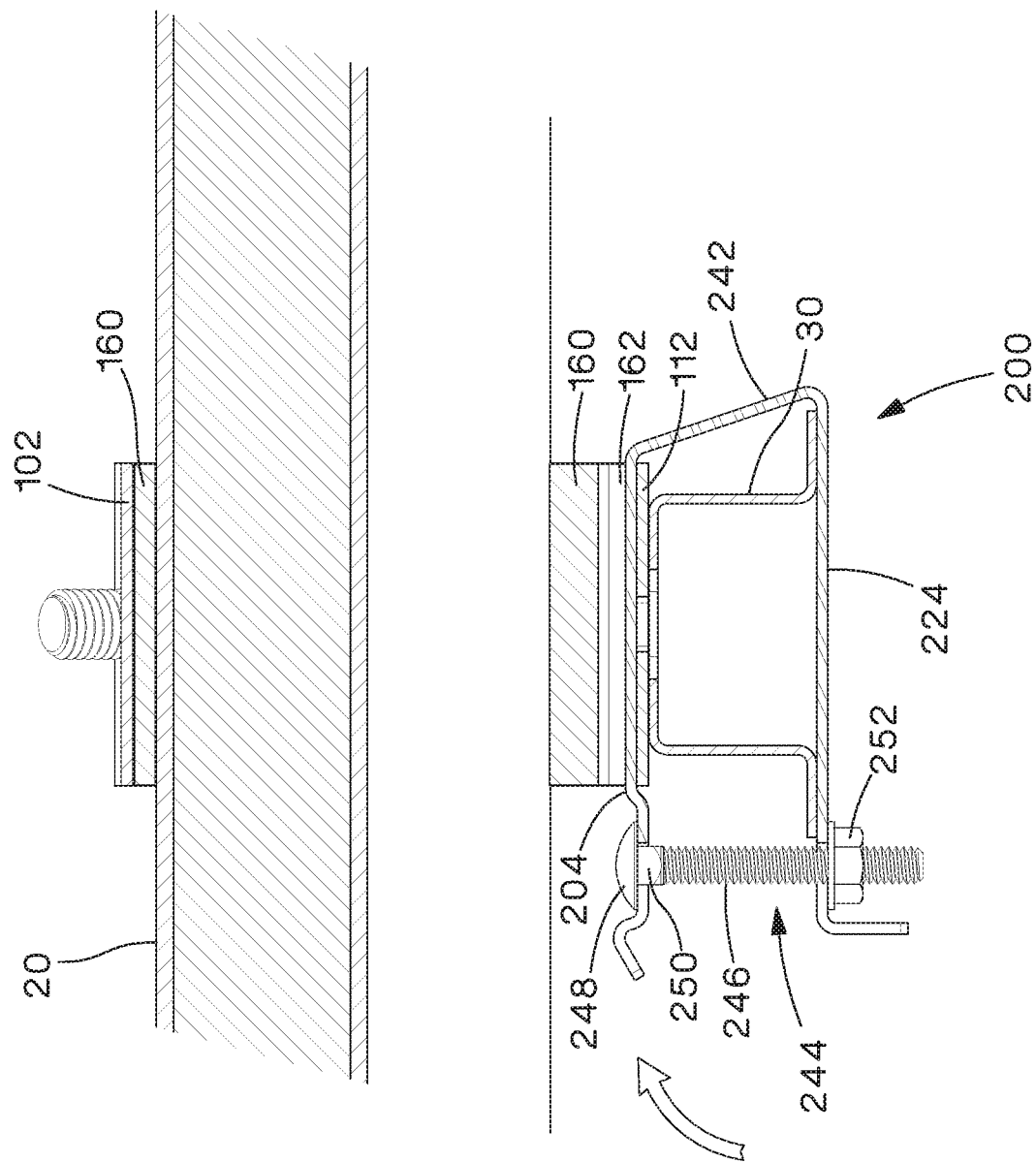
FIG. 41 is a cross-sectional view of the cleat assembly and bracket assembly of FIG. 39 with the bracket assembly in a closed position and securing the bracket assembly to the ladder rung.

Bracket assembly 200 is then secured to ladder rung 30 and cleat assembly 100 by rotating fastener 244 upward from the open position (FIG. 11) to the closed position (FIG. 13) until bolt 246 engages slot 206 in first leg 204 and tightening nut 252 on bolt 246 (FIG. 41).

Figure 42:
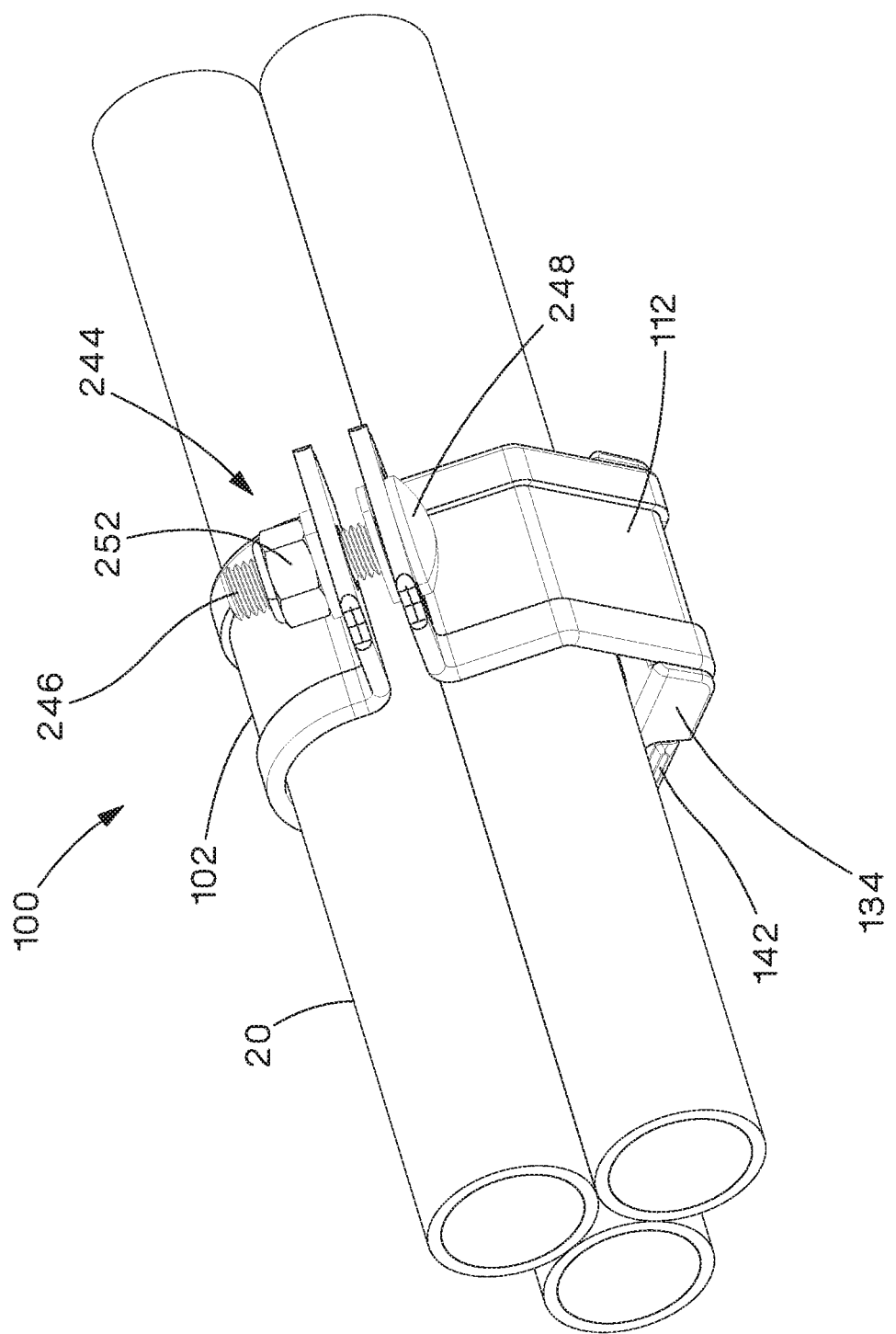
FIG. 42 is a perspective view of the cleat assembly of FIG. 4 with exemplary trefoil cables.

In some installations, depending on the design of the cable layout, cable cleats may not be installed directly to a ladder rung. This is called an intermediate installation (FIG. 42). In these types of installations, cables 20, in a trefoil or other arrangement, are positioned within cleat assembly 100/100A. Cleat assembly 100/100A is then rotated to the closed position and secured. In the described examples, cleat assembly 100/100A is secured by inserting bolt 128 through holes 110, 120 in upper and lower shells 102, 112 and threading nut 130 onto bolt 128 to secure upper and lower shells 102, 112 when rotated into a closed position. A spacer plug 142 can also be inserted into slot 162 in flexible cable protection insert 160, or slot 140 in base spacer 134, to provide additional support when forces act on cleat assembly 100/100A.

Figure 43:
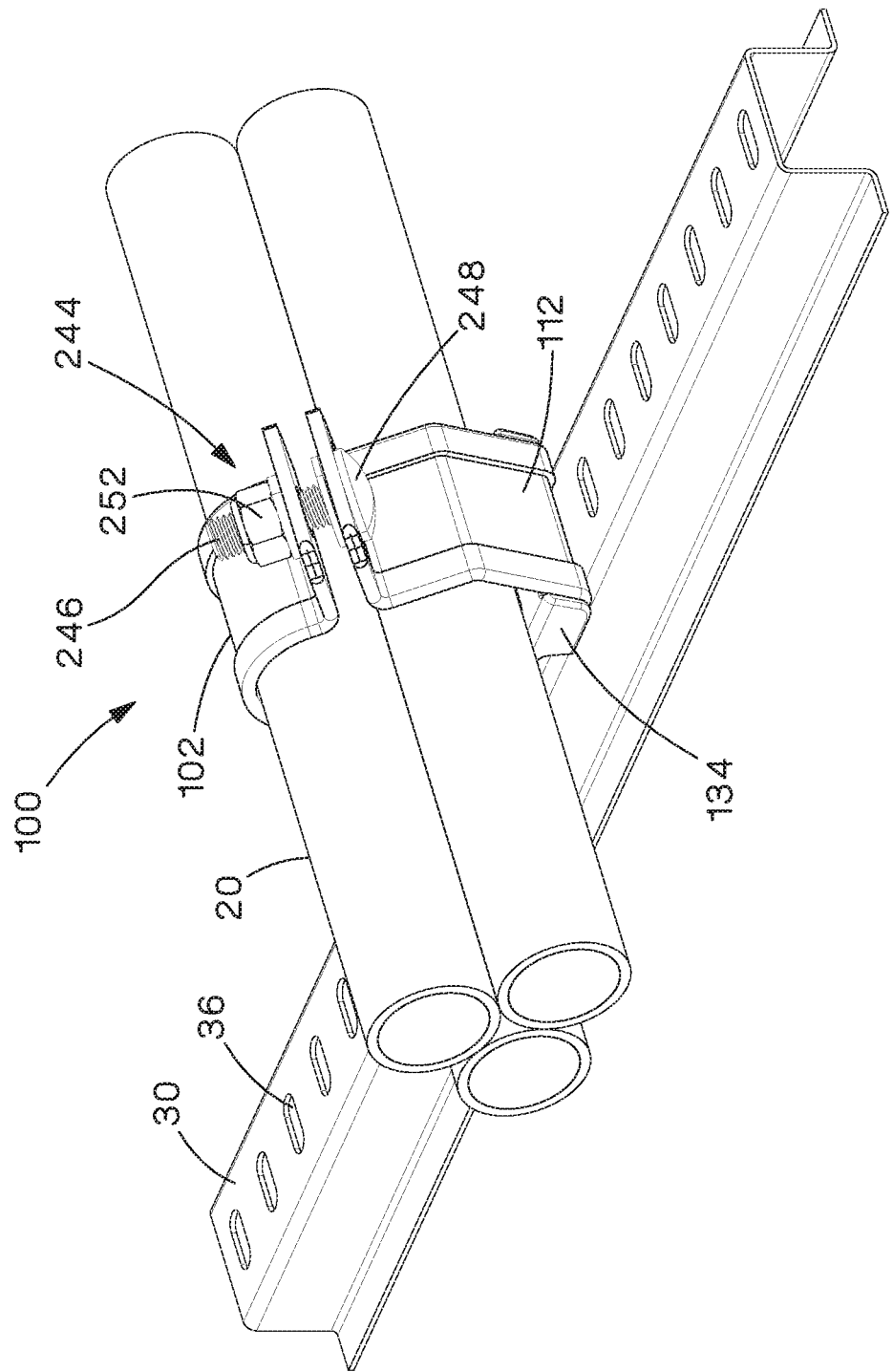
FIG. 43 is a perspective view of the cleat assembly of FIG. 42 secured to a ladder rung with a bolt.
Figure 44:
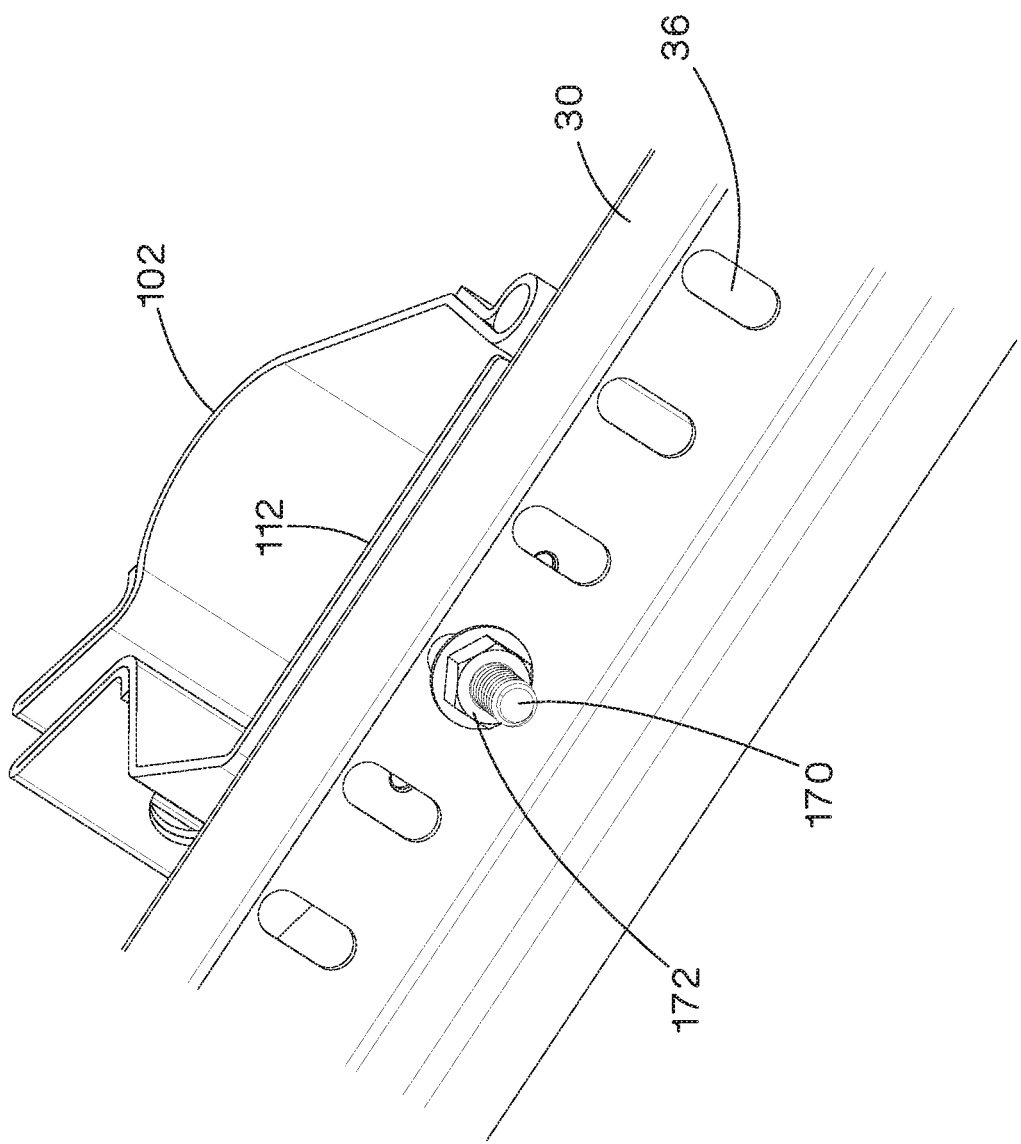
FIG. 44 is a bottom perspective view of the cleat assembly of FIG. 43.

If cleat assembly 100/100A is to be mounted to ladder rung 30 and ladder rung 30 includes holes 36, cleat assembly 100/100A can also be installed to ladder rung 30 with a bolt 170 and nut 172 (FIGS. 43-44). In this type of installation, cleat assembly 100/100A is positioned on ladder rung 30, bolt 170 is inserted through a hole 145 (FIGS. 6-8) in base spacer 134 (or a hole in flexible cable protection insert), a hole in lower shell 112, and one of the holes 36 in ladder rung 30 and nut 172 is threaded onto bolt 170 to secure cleat assembly 100/100A to ladder rung 30. When secured, the head of bolt 170 is positioned in slot 162 of flexible cable protection insert 160 or slot 140 of base spacer 134. Cables 20, in a trefoil or other arrangement, are then positioned within cleat assembly 100/100A and cleat assembly 100/100A is rotated to the closed position and secured. In the described examples, cleat assembly 100/100A is secured by inserting bolt 128 through holes 110, 120 in upper and lower shells 102, 112 and threading nut 130 onto bolt 128 to secure upper and lower shells 102, 112 when rotated into a closed position.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A method for installing a cable management assembly, comprising the steps of:
   positioning a cleat assembly on a ladder rung;
   positioning a cable within the cleat assembly;
   securing the cleat assembly in a closed position;
   inserting a bracket assembly through the cleat assembly and around the ladder rung;
   securing the bracket assembly to the ladder rung; and
   wherein the cleat assembly comprises an upper shell, a lower shell rotatably coupled to the upper shell, a bolt insertable through holes in the upper and lower shells, a nut threaded onto the bolt to secure the upper and lower shells when rotated into a closed position, and a flexible cable protection insert positioned within the upper and lower shells and the bracket assembly is inserted through a transverse slot formed in the cable protection insert.

2. The method for installing a cable management assembly of claim 1, wherein the cable is a trefoil cable.

3. The method for installing a cable management assembly of claim 1, wherein the cleat assembly comprises a base spacer secured to the lower shell of the cleat assembly and the bracket assembly is inserted through a transverse slot formed in the base spacer.

4. The method for installing a cable management assembly of claim 3, wherein the base spacer is secured to the lower shell by a threaded member extending through a hole in the base spacer and threaded into a threaded hole in the lower shell.

5. The method for installing a cable management assembly of claim 3, further comprising a secondary spacer removeably secured to the base spacer.

6. The method for installing a cable management assembly of claim 5, wherein the secondary spacer is removably secured to the base spacer via a snap fit.

7. The method for installing a cable management assembly of claim 3, wherein the bracket assembly includes a protrusion extending from an outer surface of a leg of the bracket assembly and the protrusion is positioned within the slot in the base spacer.

8. A method for installing a cable management assembly, comprising the steps of:
   positioning a cleat assembly on a ladder rung;
   positioning a cable within the cleat assembly;
   securing the cleat assembly in a closed position;
   inserting a bracket assembly through the cleat assembly and around the ladder rung;
   securing the bracket assembly to the ladder rung;
   wherein the bracket assembly comprises a C-shaped bracket having a first leg, a second leg extending parallel to the first leg, and a third leg interconnecting the first and second legs and a fastener securable between the first and second legs of the bracket assembly; and
   one of the first leg or the second leg is inserted through the cleat assembly.

9. The method for installing a cable management assembly of claim 8, wherein:
   the fastener includes a bolt extending through a slot in the second leg and a nut threaded onto the bolt to retain the bolt in the slot in the second leg; and
   the bracket assembly is secured to the ladder rung by rotating the bolt until the bolt engages a slot in the first leg and tightening the nut.

10. The method for installing a cable management assembly of claim 9, wherein the first leg includes a flange at a distal end to prevent the fastener from dislodging from the first leg.

11. The method for installing a cable management assembly of claim 10, wherein the slot in the first leg is a T-shaped slot having a longitudinal portion extending through the first leg and a transverse portion extending across the flange.

12. The method for installing a cable management assembly of claim 8, wherein at least one of the first leg and the second leg includes an inset portion to receive the cleat assembly.

13. The method for installing a cable management assembly of claim 8, wherein at least one of the first leg and the second leg comprise lateral flanges to engage the ladder rung to prevent movement of the bracket on the ladder rung.

14. The method for installing a cable management assembly of claim 13, wherein the flanges each comprise a plurality of teeth.

15. The method for installing a cable management assembly of claim 8, wherein the first leg includes folded edges and a folded end to provide strength to the first leg.

16. The method for installing a cable management assembly of claim 15, wherein the folded edges and the folded end capture the fastener when in a closed position to prevent movement of the fastener.

17. The method for installing a cable management assembly of claim 15, wherein the folded edges each form a flange that extends from each side of the first leg and are bent over the first leg to create a gap between the folded edges and the first leg, and wherein the folded end forms an end flange that extends from a distal end of the first leg and is bent back to extend over the first leg to create a gap between the folded end and the first leg.

18. The method for installing a cable management assembly of claim 17, wherein the flanges of the folded edges each have a cut out section that together form a semi-circular opening for receiving the fastener.

19. The method for installing a cable management assembly of claim 17, wherein the first leg having a longitudinal slot, wherein the longitudinal slot includes a first portion that extends into the first leg and a second portion that extends into the end flange at the distal end of the first leg.

20. The method for installing a cable management assembly of claim 8, wherein upwardly extending lateral flanges extend from sides of the second leg, whereby the lateral flanges can be used to engage a ladder rung to tightly secure the bracket to the ladder rung.

21. A method for installing a cable management assembly, comprising the steps of:
   positioning a cleat assembly on a ladder rung;
   positioning a cable within the cleat assembly;
   securing the cleat assembly in a closed position;
   inserting a bracket assembly through the cleat assembly and around the ladder rung;
   securing the bracket assembly to the ladder rung; and
   wherein the cleat assembly comprises an upper shell, a lower shell rotatably coupled to the upper shell, a bolt insertable through holes in the upper and lower shells, a nut threaded onto the bolt to secure the upper and lower shells when rotated into a closed position, and a base spacer secured to the lower shell of the cleat assembly and the bracket assembly is inserted through a transverse slot formed in the base spacer.

* * * * *